US011042952B2

(12) United States Patent
Vij

(10) Patent No.: US 11,042,952 B2
(45) Date of Patent: Jun. 22, 2021

(54) SYSTEMS, APPARATUS, AND METHODS FOR INTEGRATING AND STREAMLINING THE PROCESS OF ISSUING CITATIONS WHILE SIMULTANEOUSLY ENHANCING SECURITY OF LAW ENFORCEMENT OFFICERS (LEOS)

(71) Applicant: 365 Labs, LLC, Baton Rouge, LA (US)

(72) Inventor: Mohit Vij, Baton Rouge, LA (US)

(73) Assignee: 365 Labs, LLC, Baton Rouge, LA (US)

( * ) Notice: Subject to any disclaimer, the term of this patent is extended or adjusted under 35 U.S.C. 154(b) by 0 days.

(21) Appl. No.: 16/943,609

(22) Filed: Jul. 30, 2020

(65) Prior Publication Data
US 2020/0387992 A1 Dec. 10, 2020

Related U.S. Application Data

(63) Continuation of application No. PCT/US2020/019764, filed on Feb. 25, 2020.
(Continued)

(51) Int. Cl.
*G06Q 50/26* (2012.01)
*G06F 16/953* (2019.01)
(Continued)

(52) U.S. Cl.
CPC .......... *G06Q 50/26* (2013.01); *G06F 16/953* (2019.01); *G06K 7/10722* (2013.01); *G06K 7/1413* (2013.01)

(58) Field of Classification Search
CPC .. G06Q 50/26; G06F 16/953; G06K 7/10722; G06K 7/1413
See application file for complete search history.

(56) References Cited

U.S. PATENT DOCUMENTS 9,024,783 B1 5/2015 Alfaro
9,552,734 B2 1/2017 Zlojutro
(Continued)

OTHER PUBLICATIONS

International Search Report and Written Opinion in International Patent Application No. PCT/US2020/019764 dated May 5, 2020, 16 pages.

*Primary Examiner* — Laura A Gudorf
(74) *Attorney, Agent, or Firm* — Smith Baluch LLP

(57) ABSTRACT

Systems and methods for issuing, by an officer, a citation to an offender associated with a legal violation is described herein. The method can include acquiring, via an optical scanner, personal information associated with a driver license of the offender and vehicle information associated with a vehicle associated with the offender and with the legal violation. One or more databases can be queried to identify personal information associated with the offender, vehicle information associated with the vehicle, and one or more remedial options in response to the citation. A handheld device can generate the citation by including the personal information, the vehicle information, the legal violation, and an indication of the remedial option. The offender can sign the ticket electronically to generate the executed ticket. The executed ticket can be transmitted to a smart phone or a printing device, or an email account associated with the offender.

37 Claims, 17 Drawing Sheets

Related U.S. Application Data

(60) Provisional application No. 62/810,318, filed on Feb. 25, 2019, provisional application No. 62/810,313, filed on Feb. 25, 2019.

(51) Int. Cl.
*G06K 7/10* (2006.01)
*G06K 7/14* (2006.01)

(56) References Cited

U.S. PATENT DOCUMENTS

| | | | |
|---|---|---|---|
| 9,704,392 B2 | 7/2017 | Wang | |
| 2002/0036565 A1* | 3/2002 | Monroe | G08G 1/017 340/425.5 |
| 2006/0214783 A1* | 9/2006 | Ratnakar | G08G 1/0175 340/505 |
| 2008/0238719 A1 | 10/2008 | Marchasin et al. | |
| 2009/0175507 A1* | 7/2009 | Schaffner | G06Q 90/00 382/117 |
| 2014/0201064 A1 | 7/2014 | Jackson et al. | |
| 2015/0243165 A1 | 8/2015 | Elsheemy | |
| 2016/0078759 A1 | 3/2016 | Nerayoff et al. | |
| 2016/0358297 A1 | 12/2016 | Alon et al. | |

\* cited by examiner

Payment & Collections

Person

Details

| First Name | | Last Name | |
|---|---|---|---|
| DRIVER | | TEST | |
| Middle | Suffix | Gender | Race |
| A | | M | |
| Date of Birth | | Age | Juvenile |
| 04/14/1973 | 📅 | 45 | |
| State Id | | State | |
| SSN | | Ethnicity | |

OLN

| OLN | State | Class |
|---|---|---|
| 7000064 | LA | E |
| OLN Expiration | | ✓ EXP | ✓ SUS | REV |
| 05/01/2012 | 📅 | | | |

Address

| Number | Direction | Name |
|---|---|---|
| 123 | | STREET |
| Type | Unit | City |
| | | BATON ROUGE |

| 32:61 Speeding | Speed | Radar |
| --- | --- | --- |
|  | Zone |  |
| 32:295.1 Failure to use safety belt | 32:295.1 Count 0 | 32:1304 Motor vehicle inspection law |
| 32:121 Failure to yield right of way to vehicle on right or intersection | 32:55 Operation of vehicle in excluded area | 32:318 Audible and visual signals required on certain vehicles |
| 32:411 No motorcyle endorsement | 32:402 No drivers license | 32:232 Running a red light or a caution light |
| Insurance | More |  |

| 8900 Jimmy Wedell Dr | 8900 Jimmy Wedell Dr | 8900 Jimmy Wedell Dr |
|---|---|---|
| 8900 Jimmy Wedell Dr | 8900 Jimmy Wedell Dr | 8900 Jimmy Wedell Dr |
| 8900 Jimmy Wedell Dr | 8900 Jimmy Wedell Dr | 8900 Jimmy Wedell Dr |

Favorited Locations (hold to override)

Location
10555 Highland Road

| Hwy Type | Route | |
|---|---|---|
| US | 61 | Mile Post |

Last 3 Locations

| 10555 Highland Road | Bluebonnet | Bluebonnet |
|---|---|---|

...

FIG. 16 ized order issued by a LEO

SYSTEMS, APPARATUS, AND METHODS FOR INTEGRATING AND STREAMLINING THE PROCESS OF ISSUING CITATIONS WHILE SIMULTANEOUSLY ENHANCING SECURITY OF LAW ENFORCEMENT OFFICERS (LEOS)

CROSS-REFERENCE TO RELATED APPLICATIONS

This application is a bypass continuation application of International Application No. PCT/US2020/019764, filed on Feb. 25, 2020, entitled "Systems, Apparatus, and Methods for Integrating and Streamlining the Process of Issuing Citations while Simultaneously Enhancing Security of Law Enforcement Officers (LEOs)," which claims the priority benefit, under 35 U.S.C. § 119(e), of U.S. Application No. 62/810,313, entitled "Law Enforcement Systems and Methods," filed on Feb. 25, 2019, the disclosure of which is incorporated herein by reference in its entirety. This application also claims the priority benefit, under 35 U.S.C. § 119(e), of U.S. Application No. 62/810,318, entitled "Law Enforcement Systems and Methods," filed on Feb. 25, 2019, the disclosure of which is incorporated herein by reference in its entirety.

BACKGROUND

A citation is a written or electronic order issued by a LEO or other authorized official. A citation can release a person on the promise that the person will appear in court and/or a government office, or will pay a fine. However, the process of issuing citations is often complicated. In order to issue an electronic citation, the law enforcement officer (LEO) will have to type out data related to the person on one or more field computing devices. For instance, the LEO may need to type out the person's full name, driver license number, the person's vehicle identification number, and/or the like on a computer. This could often distract the LEOs since they have to focus on the screen, and can extend the amount of time the LEO spends at the scene of the violation, which may be an unsafe area. Therefore, in such instances, the security of the LEOs is jeopardized.

Considering the security issues, a majority of the LEOs prefer issuing a written citation instead of an electronic citation. However, data from a written citation will need to be manually entered in computer systems in order to streamline the process of ensuring that the person fulfills their promise. Written citations make it difficult to streamline such processes. For instance, it makes it difficult to share data between different government offices and the court. Additionally, it can also make the process cumbersome and time consuming.

SUMMARY

There is an unmet need to streamline the process of issuing citations while also simultaneously prioritizing safety of the LEOs.

In one implementation a system for issuing, by an officer, a ticket to an offender associated with a legal violation is disclosed herein. The system can include a first database including location-specific legal information, the location-specific legal information specifying remedial options available for each legal violation in a predetermined area. The system can also include a handheld device communicably coupled to the first database and associated with the officer. The handheld device can include: an optical scanner; a location sensor; a user interface for the officer to interact with the handheld device; a network interface; and a controller. The controller can be configured to acquire, upon input from the officer, via the optical scanner, personal information associated with a driver license of the offender; acquire, upon input from the officer, via the optical scanner, vehicle information associated with a vehicle associated with the offender and with the legal violation; receive, from the officer, an indication of the legal violation; without further input from the officer, generate the ticket by: acquire, via the location sensor, location information associated with the handheld device; querying, via the network interface, one or more second databases with the personal information and receiving, in response to said querying, at least a portion of person identification information of the offender; querying, via the network interface, one or more third databases with the vehicle information and receiving, in response to said querying, at least a portion of the vehicle identification information of the offender; querying, via the network interface, the first database with the indication of the legal violation and receiving, in response to said querying, a specification of a first remedial option of a set of remedial options associated with that legal violation; generating the ticket including the personal identification information, the vehicle identification information, the legal violation, an indication of the first remedial option, and a field to receive a signature of the offender; receive the signature of the offender to generate an executed ticket; and transmit an indication of the executed ticket to one or more of a printing device, to a handheld device associated with the offender, or an email account associated with the offender.

In some instances, the executed ticket can be a first executed ticket. The system can further comprise a memory communicably coupled to the controller, to store a set of executed tickets, including the first executed ticket, generated via the handheld device. In some instances, the portion of the person identification information is a first portion of the person identification information. The processor can be further configured to query the stored set of executed tickets to identify a second portion of the person identification information.

In some instances, the portion of the vehicle identification information is a first portion of the vehicle identification information, wherein the processor can be further configured to query the stored set of executed tickets to identify a second portion of the vehicle identification information. In some instances, the vehicle identification information is a unique vehicle identification number (VIN), wherein the memory stores a VIN reference table, and wherein the processor is further configured to identify the second portion of the vehicle identification information based on the VIN reference table.

In some instances, the vehicle information is a license plate number associated with the vehicle, and wherein the one or more third databases includes a motor vehicle database. In some instances, the processor can be further configured to generate the ticket by generating a unique ticket number, wherein the generated ticket includes the unique ticket number. In some instances, the indication of the first remedial option includes a machine readable code, wherein the processor can be further configured to generate the ticket by generating the machine readable code based on the specification of the first remedial option received from the first database.

In some instances, the processor can be further configured to generate the ticket by generating a unique ticket number, and wherein the machine readable code includes the unique ticket number. In some instances, the indication of the first remedial option includes an indication of electronic payment. In some instances, the indication of the first remedial option includes an indication of a requirement for court appearance. In some instances, the optical scanner includes a camera or a barcode scanner. In some instances, the location sensor is a global positioning system (GPS) sensor. In some instances, the controller can be further configured to, during the generating the ticket: query, via the network interface, one or more fourth databases with the personal information and receiving, in response to said querying, search results associated with the offender; and present, via the user interface, an indication of the search results to the officer.

In some instances, the one or more fourth databases includes a watch list for persons of interest, and the search results are indicative of the presence of the offender on the watch list. In some instances, the one or more fourth databases includes a warrants database, and the search results are indicative of one or more warrants associated with the offender. In some instances, the one or more fourth databases includes a crime database, and the search results are indicative of criminal events associated with the offender.

In some instances, the one or more fourth databases includes a mental health database, and the search results are indicative of mental health events associated with the offender. In some instances, the indication of the search results include one or more of an alert, a warning, and a caution. In some instances, the first database stores person of interest information for a set of persons of interest including, for each person of interest, an address or last location associated with that person of interest, wherein the controller is further configured to, during the generating the ticket: monitor the location sensor to determine when the officer has been at a current location of the handheld device for greater than a predetermined time period; identify a predetermined radius around the current location; query the first database to identify a first person of interest having an associated address or associated last location within the predetermined radius; and present, via the user interface, an indication of the first person of interest to the officer.

In some instances, the controller is further configured to, during the generating the ticket: query, via the network interface, one or more fourth databases with identifying information for the first person of interest and receiving, in response to said querying, search results associated with the first person of interest; and present, via the user interface, an indication of the search results to the officer. In some instances, the one or more fourth databases includes a warrants database, and the search results are indicative of one or more warrants associated with the first person of interest.

In some instances, the one or more fourth databases includes a crime database, and the search results are indicative of a criminal history of the first person of interest. In some instances, the one or more fourth databases includes a mental health database, and the search results are indicative of mental health events associated with the first person of interest. In some instances, the controller of the handheld device is a first controller, wherein the handheld device further includes a memory communicably coupled to the first controller, to store the first executed ticket generated via the handheld device, the system further comprising: a ticket database communicably coupleable to the handheld device over a network to store past executed tickets; and a server communicably coupled to the ticket database and including a second controller, wherein the first controller is further configured to, after the transmitting the indication of the executed ticket, upon establishing network connectivity with the ticket database over the network, transfer data associated with the first executed ticket to the ticket database, wherein the second controller is configured to: correlate the first executed ticket with one or more tickets of the past executed tickets in the ticket database based on one or more of the personal identification information and the vehicle identification information of the first executed ticket; and if no correlation of the first executed ticket with any ticket of the past executed tickets exists flag the first executed ticket for manual review.

In some instances, the second controller is further configured to place data associated with the first executed ticket on a streaming data feed over the network for consumption by third party devices.

In one implementation, a method for issuing, by an officer, a ticket to an offender associated with a legal violation is described herein. The method can include: acquiring, upon input from the officer, via an optical scanner included in a handheld device, personal information associated with a driver license of the offender; acquiring, upon input from the officer, via the optical scanner, vehicle information associated with a vehicle associated with the offender and with the legal violation; receiving, from the officer, an indication of the legal violation; without further input from the officer, generating the ticket by: acquiring, via a location sensor included in the handheld device, location information associated with the handheld device; querying, via a network interface included in the handheld device, one or more second databases with the personal information, and receiving, in response to the said querying, at least a portion of person identification information of the offender; querying, via the network interface, one or more third databases with the vehicle information, and receiving, in response to the said querying, at least a portion of the vehicle identification information of the offender; querying, via the network interface, a first database with the indication of the legal violation and receiving, in response to said querying, a specification of a first remedial option of a set of remedial options associated with that legal violation, wherein the first database is communicably coupled to the handheld device and includes location-specific legal information, the location-specific legal information specifying remedial options available for each legal violation in a predetermined area; generating, via a controller included in the handheld device, the ticket including the personal identification information, the vehicle identification information, the legal violation, an indication of the first remedial option, and a field to receive a signature of the offender; receiving, at the controller, the signature of the offender to generate an executed ticket; and transmitting, from the controller, an indication of the executed ticket to one or more of a printing device, to another handheld device associated with the offender, or an email account associated with the offender.

In some instances, the executed ticket is a first executed ticket, the method can further comprise: storing, in a memory communicably coupled to the controller, a set of executed tickets, the set of executed tickets including the first executed ticket generated via the handheld device. In some instances, the portion of the person identification information is a first portion of the person identification information, the method further comprising: querying the stored set of executed tickets to identify a second portion of the person identification information.

In some instances, the portion of the vehicle identification information is a first portion of the vehicle identification information, the method further comprising: querying the stored set of executed tickets to identify a second portion of the vehicle identification information. In some instances, the vehicle identification information is a unique vehicle identification number (VIN), the method further comprising: storing, in the memory, a VIN reference table; and identify, via the controller, the second portion of the vehicle identification information based on the VIN reference table.

In some instances, the vehicle information is a license plate number associated with the vehicle. In some instances, generating the ticket further comprises generating a unique ticket number, wherein the generated ticket includes the unique ticket number. In some instances, the indication of the first remedial option includes a machine readable code, the method further comprising: generating the ticket by generating the machine readable code based on the specification of the first remedial option received from the third database.

In some instances, generating the ticket include generating a unique ticket number, and wherein the machine readable code includes the unique ticket number. In some instances, the indication of the first remedial option includes an indication of electronic payment. In some instances, the indication of the first remedial option includes an indication of a requirement for court appearance.

All combinations of the foregoing concepts and additional concepts are discussed in greater detail below (provided such concepts are not mutually inconsistent) and are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 11 is an image of an example display on the user interface of a computing device to look up information regarding a vehicle associated with an offender.

FIG. 13 is an image of an example display of the personal information of an offender on the computing device FIG. 14 is an image of an example display on the user interface of a computing device to enable a LEO to issue citation.

FIG. 15 is an image of an example display to input location of the offense on the user interface of the computing device.

FIG. 16 is an image of an example display of a signature page on the user interface of the computing device.

DETAILED DESCRIPTION

Figure 1:
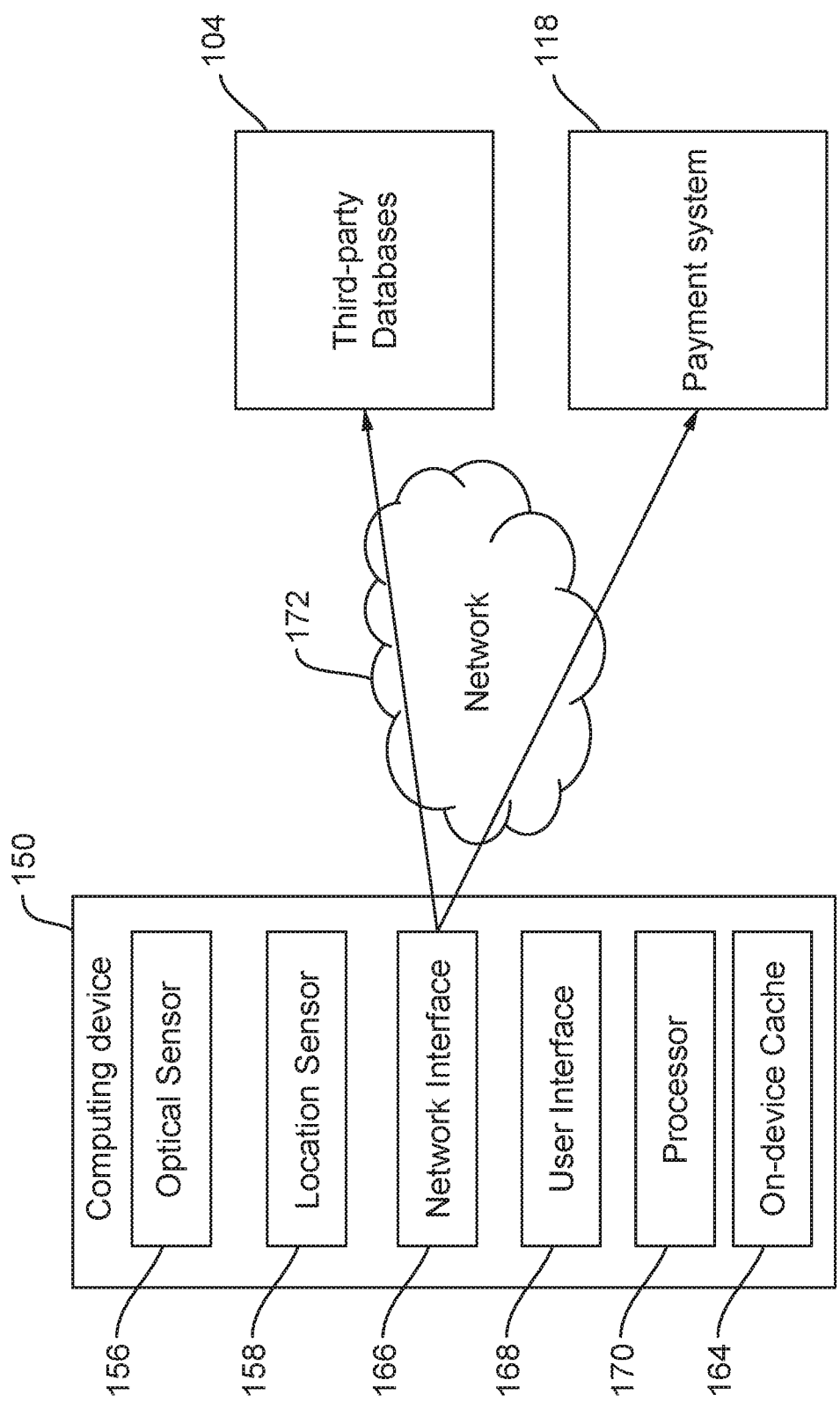
FIG. 1 illustrates a high-level overview of an example system for issuing citations.

Widely used methods of issuing law enforcement citations include electronic citations and written citations. However, these methods have various disadvantages. Electronic citations often jeopardize security of LEOs. For example, while issuing electronic citations LEOs have to type out data related to the offender on computing devices. This could distract the LEOs since they have to focus on the screen thereby jeopardizing their security. Written citations are cumbersome and require time and manual entry to convert data from them into electronic data. Moreover, these methods make it difficult to share data between different government agencies.

Therefore, there is a need for a methodology to streamline the process of issuing citations while also prioritizing safety of the LEOs.

Technical Improvements Over Existing Methodologies

The methodology described herein can streamline the process of issuing citations by making the process of entering data more simple than issuing written citations. For instance, the systems and methods described herein can enter data in an automated fashion by obtaining one or more scans of the driver license and/or vehicle identification number (VIN). This makes the process of entering data more simple than a LEO having to manually enter data while issuing written citations.

Additionally, the systems and methods described herein can automatically fill in as much data as possible in order to shorten the process of issuing citations. For instance, in response to obtaining a scan of the driver license and/or the VIN, the systems and methods described herein can query one or more internal (e.g., database within the systems) and/or third-party databases (e.g., LEO databases, government agency databases, court databases, and/or the like) to obtain data regarding the offender and/or a vehicle belonging to the offender. This data can be used to automatically fill in information required to issue a citation thereby automating and shortening the process.

The systems and methods described herein can also proactively provide situational information to LEOs in order to prioritize their safety. For instance, by querying internal and/or third-party databases to obtain information regarding the offender, the systems and methods described herein can alert the LEOs if the offender has prior history committing crimes. Furthermore, the systems and methods described herein can use global positioning system (GPS) to determine the location of the LEOs and the amount of time the LEOs have spent interacting with the offenders. It can also determine if the offenders have been spotted in the current location at a prior date and time. This information can be compiled, queried, and compared against historical data to determine if the LEOs are in danger and an alert and/or help can be sent to the LEO accordingly.

The systems and methods described herein provide offline ability by fulfilling the function of issuing citations even when the system (i.e., the system described herein to issue citations) is not connected to a network. For instance, the system for issuing citations can include an on-device cache and/or memory within the system that can store at least some of the data that is required to issue citations. For instance, the on-device cache can store data relating to citations that were issued in the last 90 days. This data can include information that might be useful in automatically filling information for issuing citations. Therefore, if the system is not connected to a network, the on-device cache can be queried to pull data for fulfilling the function of issuing citations.

Furthermore, the systems and methods described herein can transmit citation data to secondary organizations such as law enforcement agencies, government agencies, payment collection agencies, and/or the like that are responsible for administering charges and collecting fines thereby making the process of paying fines associated with the citations as simple as possible.

High-level Overview of an Example System for Issuing Citations

FIG. 1 illustrates a high-level overview of an example system 100 for issuing citations. These citations can be associated with a legal violation and/or offense that may be committed by an offender. System 100 includes a computing device 150 that can be accessed by a LEO to issue citations. Some non-limiting examples of computing device 150 include mobile devices and smart phones (e.g., Apple iPhone®, Samsung Galaxy®, Google Pixel®, etc.), computers (e.g., desktops, personal computers, laptops etc.), and/or tablets and e-readers (e.g., Apple iPad®, Samsung Galaxy® Tab, Microsoft Surface®, Amazon Kindle®, etc.).

The computing device 150 can include a processor 170 (also referred to herein as a "controller"). In some implementations, such a processor 170 can be a central processing unit (CPU). One form of processor 170 is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory, such as on-device cache 164 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. The instruction codes can be accessed from the on-device cache 164 to execute software programs on the computing device 150. These software programs can include application software (e.g., mobile apps, web apps, etc.). In one implementation, system 100 can include an application software that can be configured to issue citations when rendered on the computing device 150. The application software can be downloaded on the computing device 150 from a digital distribution platform such as app store or application store (e.g., Chrome® web store, Apple® web store, etc.).

The application software can be rendered on a user interface 168 on the computing device 150. A LEO can access the system 100 via the user interface 168. The user interface 168 can include one or more input components that can enable the LEO to input data regarding the offender and/or the vehicle. The user interface 168 can also display data that can be obtained from the on-device cache 164 and/or external third-party databases.

The computing device 150 can also include an optical sensor 156 (also referred to as "optical scanner") to scan information associated with an offender and/or a vehicle. The optical sensor can be a laser barcode scanner. In some implementations, the optical sensor 156 can be downloaded as an application software on the computing device 150. In some implementations, the optical sensor 156 can be a hardware device that can be coupled to/integrated with the computing device 150.

The computing device 150 can also include a location sensor 158 to identify and/or calculate the location associated with the computing device 150. For instance, the computing device 150 can include a Global Positioning System (GPS) chip as a location sensor 158 to detect the location associated with the computing device 150. In some instances, the computing device 150 can use triangulation software as a location sensor 158 to track the location of the computing device 150.

The computing device 150 can also include a network interface 166 that is a point of interconnection between the computing device 150 and one or more private and/or public networks (e.g., network 172). In some implementations, the network interface 166 can be a network interface card (NIC). In some implementations, the network interface 166 can be implemented in a software (e.g., loopback interface 127.0.0.1 for IPv4 and ::1 for IPv6). The computing device 150 can be connected to one or more peripheral devices such as third-party databases 104 and payment system 118 via the network interface 166.

The computing device 150 can also include an on-device cache 164 (also referred to as "memory") to store information on the computing device 150. In some implementations, the on-device cache 164 can include instructions to render the application software that can be configured to issue citations. In some implementations, the on-device cache can include information from old citations. Put differently, data from citations that were issued within the last 90 days can be stored on the on-device cache 164. That is, data regarding offenders and/or corresponding vehicles may be available on the device-cache 164. Some non-limiting examples of on-device cache 164 can include a (fixed and/or removable) magnetic disk drive; a magneto-optical drive; an optical drive (i.e., Blueray, CD ROM/RAM/Recordable (R)/Re-Writable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like.

The computing device 150 can access one or more third-party databases 104 (also referred to as "second database" and/or "third database") via network 172 (e.g., Internet). These third-party databases can include, department of motor vehicles (DMV) database, criminal justice information system (CJIS) database, national crime information center (NCIC) database, and/or the like. These third-party databases 104 can provide information regarding the offender, vehicle, location of the LEO, and threat that might be associated with the LEO when the LEO interacts with the offender. In some implementations, third-party databases can also include databases associated with the agency that the LEO belongs to, is employed with, and/or is otherwise associated with (i.e., LEO agency database). In some implementations, at least some of these databases may be controlled by and/or associated with the same entity, such as the same law enforcement agency (e.g., city policy department, etc.).

The computing device 150 can also access the payment system 118 via network 172. Once the citation is issued, the citation will need to be paid and/or pleaded by the offender. Put differently, the offender can be offered remedial options in response to the issued citation. The data that is captured by the computing device 150 and inputted by the LEO can be made available to the payment system 118 via network 172. This payment system may be linked to the clerk and the district attorney's office. The citation fee can be paid via the payment system 118 either online or in-person.

Example System for Issuing Citations

Figure 2:
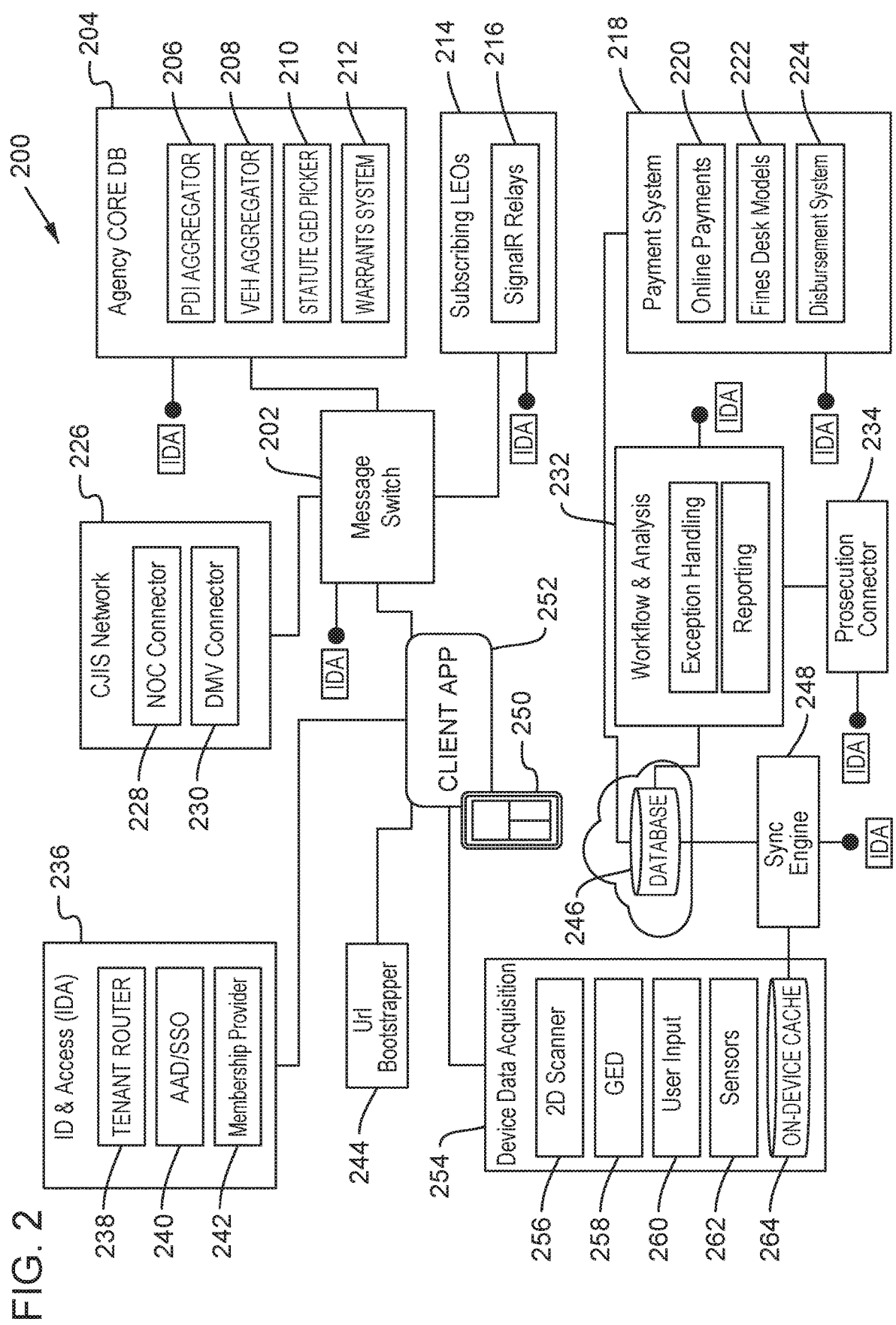
FIG. 2 illustrates an in-depth example system for issuing citations.

FIG. 2 illustrates an in-depth example system 200 for issuing citations. System 200 can be structurally and functionally similar to system 100 in FIG. 1. System 200 includes a computing device 250 (structurally and functionally similar to computing device 150 in FIG. 1) that can be accessed by a LEO to issue citations.

The computing device 250 can include a processor that can execute instructions to render software programs on the computing device 250. These software programs can include application software (e.g., mobile apps, web apps, etc.) such as an application software 252. Application software 252 can be configured to issue citations when rendered on the computing device 250. Application software 252 can be downloaded on the computing device 250 from a digital distribution platform such as app store or application store (e.g., Chrome® web store, Apple® web store, etc.). Put differently, the LEOs can be provided with the computing device 250 and the LEOs can download the application software 252 on the computing device 250. In some implementations, the application software 252 can come pre-installed on the computing device 250. Put differently, the computing device 250 with the pre-installed application software 252 can be distributed to the LEOs.

The computing device 250 can include data acquisition components 254 to acquire data and/or information associated with the offender receiving the citation, vehicle, and/or the location of the LEO. In some implementations, the data acquisition components 254 can be integrated with and/or can be communicably coupled to the computing device 250. For instance, the data acquisition components 254 can be hardware components that can be integrated with the computing device 250. In some implementations, the data acquisition components 254 can be hardware components that are connected to the computing device 250 via a network. In some implementations, the data acquisition components 254 can be rendered as an application and/or a software program on the computing device 250.

One such data acquisition component 254 can be a 2D laser barcode scanner 256 (structurally and functionally similar to optical sensor 156 in FIG. 1) or a 2D barcode scanner 256 to scan information associated with an offender and/or a vehicle. In some implementations, a digital scanner can be downloaded as a software application from digital distribution platform and rendered on the computing device 250. The digital scanner can scan barcodes and other such information using a camera associated with the computing device 250. The digital scanner can then perform image recognition to acquire information from the images. In some implementations, the 2D laser barcode scanner 256 can be integrated with and/or coupled to the computing device 250. For instance, the 2D laser barcode scanner 256 can be a hardware component that can be integrated within the casing and/or housing of the computing device 250. In some implementations, the 2D laser barcode scanner 256 can be a hardware component that can be connected via wire to the computing device 250. In some implementations, the 2D laser barcode scanner 256 can be a hardware component that can be wirelessly connected to the computing device 250 via a network.

The 2D laser barcode scanner 256 can scan personal information associated with a driver license of the offender and/or vehicle information associated with a vehicle belonging to the offender. For example, the 2D laser barcode scanner 256 can scan a vehicle identification number (VIN) from the dashboard on the driver's side of the vehicle or from the door of the driver's side of the vehicle. In some implementations, the 2D laser barcode scanner 256 can read Code39 from the VIN (i.e., the VIN can be represented via Code39 symbology, and/or any other suitable barcode symbology such as Code-128, Universal Product Code (UPC), Interleaved 2 of 5, PostNET, PDF417, and/or the like). In some implementations, the 2D laser barcode scanner 256 can scan a part of the license plate of the vehicle to acquire vehicle information. The 2D laser barcode 256 can also scan the driver license and/or a part of the driver license (e.g., barcode on the driver license, etc.). In some implementations, the 2D laser barcode scanner 256 can read PDF417 barcode on a driver's license.

Another data acquisition component 254 can be a location sensor 258 (structurally and functionally similar to location sensor 158 in FIG. 1) to identify the location associated with the computing device 250. For instance, the computing device 250 can include a Global Positioning System (GPS) chip as a location sensor 258 to detect the location associated with the computing device 250. In some instances, the computing device 250 can use triangulation software as a location sensor 258 to track the location of the computing device 250.

The data acquisition components 254 can also include a user input component 260. In some implementations, the user input component can be a part of a user interface, such as user interface 168 in FIG. 1. The user input component 260 can enable a LEO to manually input any data relating to the offender and/or the vehicle belonging to the offender. For instance, the LEO may need to enter or select charges and/or violation information against the offender. In some implementations, although part of the personal information about the offender and information regarding the vehicle belonging to the offender can be automatically filled using the system 200, the LEO may need to fill out other parts of the information manually. For example, the LEO may use the user input component 260 to fill out the license plate number manually in some situations. The user input component 260 can be configured to take any type of input such as images, text, video, audio, a combination thereof, and/or the like. As noted above, the LEO can manually fill out information on a need-by-need basis. Put differently, system 200 can automatically fill out personal information about the offender and information regarding the vehicle. Should the computing device 250 not have access to a network and/or should the computing device 250 acquire part of the information regarding the vehicle and/or the offender, the rest of the information can be manually filled out by the LEO.

The data acquisition components 254 can also include other sensors 262 to acquire further data regarding the offender or the vehicle belonging to the offender. For instance, the other sensors 262 can include a radio-frequency identification (RFID) and/or a near field communication (NFC) sensor. In some cases, a driver license can be included and/or issued as an application software on a smartphone. This application software can transmit the license information via RFID signals generated and transmitted by the smartphone. The RFID sensor and/or the NFC sensor can detect and read the RFID signal to obtain information regarding the offender and/or the vehicle from the driver license. In some instances, the other sensors 262 can include Bluetooth sensor. In some cases, vehicles might include Bluetooth based transmitters that wirelessly transmit vehicle information. The Bluetooth sensor can obtain information regarding the vehicle from the Bluetooth based transmitter. In some instances, the other sensors 262 can include a camera. In some cases, the camera can take pictures and/or images of the offender and/or the vehicle associated with the offender. These images can be queried against one or more databases (e.g., on-device cache 164 and/or third-party databases 104 in FIG. 1) to identify the offender and/or information regarding the offender and/or the vehicle. For instance, the images can be queried using one or more image recognition techniques such as, license plate matching, optical character recognition, pattern and gradient matching, etc. For example, the camera can take a picture of the offender. Facial recognition techniques can be used to compare these images against images that are stored in the on-device cache 164 and/or in third-party databases 104. If a match is found based on the facial recognition technique(s), then the offender's information can be pulled from the on-device cache 164 and/or the third-party databases 104.

In some instances, the other sensors 262 can include a microphone to record interactions between the LEO and the offender to build additional notes on their interaction. In some cases, the microphone can be used in conjunction with a speech engine and/or speech application programming interface (API) to help LEO transcribe notes during and/or after the process of issuing the citation. For instance, the microphone can record the interactions between the offender and the LEO. A speech engine can transcribe this interaction as the LEO is issuing the citation. The written interaction can be saved as additional notes on the application software 252 as the LEO issues the citation. These additional notes can be reviewed after the issuance of the citation to determine whether the interaction was pleasant or if it included offensive language. If the interaction was not as anticipated, the offender can be further penalized if necessary. In some instances, the other sensors 262 can also include gyroscope sensors to identify assault and/or vigorous motions between the LEO and the offender. In some instances, based on this identification, an alert and/or help can be dispatched to the LEO if need be.

In some implementations, the processor included in the computing device 250 can maintain the state of the citation as the LEO uses the 2D laser barcode scanner 256 and other sensors 262 to issue the citation. Specifically, the processor included in the computing device 250 can dynamically assign a function to the 2D laser barcode scanner 256 and other sensors 262 to capture new information. The function can be assigned to either the 2D laser barcode scanner 256 and/or the other sensors 262 based on the state of the incomplete citation. For instance, the processor can identify if the acquired scan (i.e., scan acquired from either the 2D laser barcode scanner 256 and/or the other sensors 262) is in a driver license format or in a VIN format. For instance, if the acquired code is PDF417 then the processor identifies that the scan is in a driver license format. If the acquired code is in Code39 then the processor identifies that the scan is in VIN format.

If the computing device 250 identifies that the acquired scan corresponds to the driver license format, the processor included in the computing device 250 can send instructions to the 2D laser barcode scanner 256 and/or the other sensors 262 to capture information corresponding to the offender (i.e., driver license information). On the other hand, if the computing device 250 identifies that the acquired scan corresponds to the VIN, the processor included in the computing device 250 can send instructions to the 2D laser barcode scanner 256 and/or the other sensors 262 to capture information corresponding to the vehicle. In this manner, new information capture functions can be dynamically assigned to the 2D laser barcode scanner 256 and/or the other sensors 262 to capture all of the information needed for the citation. Furthermore, if the processor identifies that the scan from the 2D laser barcode scanner 256 and/or the other sensors 262 do not include a barcode (i.e., do not include driver license information or VIN), the processor implements an action such as moving the user interface on the computing device 250 to a signature screen or printing the completed citation using a printer connected to the computing device 250.

The data acquisition components 254 can also include an on-device cache 264 (which can be structurally and/or functionally similar to on-device cache 164 in FIG. 1) that can store information on the computing device 250. In some implementations, the on-device cache 264 can be a primary memory such as random access memory (RAM). In some implementations, the on-device cache 264 can be a secondary memory that exists in addition to the primary memory. The on-device cache 264 can be smaller and higher in speed than the primary memory.

The processor within the computing device 250 can look up information from the on-device cache 264 before enabling the issuance of citations. Data from old citations can be compared to the data that is acquired from the 2D laser barcode scanner 256 and/or the other sensors 262 in order to fill the required information automatically to issue a citation. For example, the data that is acquired from the 2D laser barcode scanner 256 and/or the other sensors 262 can be compared to the information stored in the on-device cache 264 to look for possible matches. This could minimize the data that would need to be manually entered by the LEO. In some implementations, old citations for up to 90 days with all their information can be store in the on-device cache 264. In some implementations, citations that are older than a predetermined time period, e.g., more than 90 days, old can be deleted automatically from the on-device cache 264. In some implementations, if the storage space on the on-device cache 264 is large, citations that are more than 90 days old can still be stored in the on-device cache 264. This could provide a basis for look up.

In some implementations, data (e.g., information regarding the offender, vehicle, citation, etc.) that is collected during the process of issuing citation is also stored in the on-device cache 264. In a similar manner, information that is collected after issuing the citation can also be stored in the on-device cache 264.

The computing device 250 can share the information from the computing device 250 with other third-party databases and/or servers via a network interface (not shown). However, should the computing device 250 not be connected to a network via the network interface, the information that is collected during the process of issuing the citation remains in the on-device cache 264 until the computing device 250 is connected to a network. Put differently, if the computing device 250 does not have a persistent connection to one or more servers, the information is maintained in the on-device cache 264 until a connection is made via the network interface.

Once the computing device 250 is connected to one or more servers and/or network via the network interface, the sync engine 248 can be configured to synchronize and push data from the on-device cache 264 to the database 246 and from the database 246 to the on-device cache 264. In some implementations, the database 246 and the sync engine 248 are communicably coupled to the on-device cache 264 via the network interface. The sync engine 248 can be manually triggered to synchronize and push data from the on-device cache 264 to the database 246. In some implementations, the sync engine 248 can be triggered automatically upon the computing device 250 connecting to a network. Additionally, the sync engine 248 can download data to the computing device 250 that can speed up the process of issuing a citation. For example, the sync engine 248 can download a dropdown list of all the states in order to speed up the process of issuing a citation. This downloaded list can be sent to the computing device 250 that ultimately issues the citation. In some implementations, the sync engine 248 can download a list of citations that the LEO is authorized to issue. The sync engine 248 can download any other information that is related to the LEO.

The citation data pushed via the sync engine 248 from the on-device cache 264 can be stored in the database 246. The database 246 can be stored on one or more servers on a cloud platform (e.g., Microsoft Azure®, Amazon® web services, IBM® cloud computing, etc.). When data is pushed via the sync engine 248 from the on-device cache 264 to the database 246, the sync engine 248 can determine a correlation between the historic data that is already stored in the database 246 and new data that is being pushed from the on-device cache 264. Put differently, the sync engine can compare the data that is pushed from the on-device cache 264 with the historical/previously saved data that is already stored in the database 246. For instance, the sync engine 248 can compare an offender's name and dob from the on-device cache 264 to names that are stored in the database 246. The sync engine 248 can determine if there are common pieces of information between the new data and the historical data. For instance, if the offender's name is common between the new data and the existing data, then a match exists. If matches exist, the new data can be related to the historical data and this new information (along with the new relation between the new data and the historic data) can be stored in the database 246. If no match exists, then the new data can be flagged and a database administrator can later determine if the new data matches with any of the historic data in the database 246. Based on the matches between historic data and new data, a determination can be made if the offender has any history of other similar citations.

A non-limiting example of comparison is described herein. Database 246 includes information regarding different persons. Each person in database 246 is associated with a unique identifier such as a globally unique identifier (GUID). GUID is a universally accepted unique value and a data type for identifiers. When a new citation is issued, information from the new citation can be stored in the on-device cache 264 as a new row. In the on-device cache 264, the column that corresponds to GUID for the new citation is left blank. When the sync engine 248 is triggered, information from the new citation is compared to each record in the database 246. If a name, date of birth, and driver license from the new citation matches with one or more records in the database 246, then that particular person's record is updated in database 246 based on the new citation and the GUID from the database 246 is linked and/or copied to the new citation on the on-device cache 264. Therefore, that person's record history is updated on database 246 as well as on the on-device cache 264 by appending information from the new citation. If no match exists, a new person record is generated in the database 246. In case only partial match exists (e.g., the name matches but the date of birth doesn't) then the new citation can be flagged for manual inspection later on.

The ID and Access (IDA) 236 can ensure that the LEOs have the necessary permission to access the system 200. Put differently, the IDA 236 can be an identity service that can run on a cloud platform. In some instances, the cloud platform can be associated with the agency that the LEO is associated with. In some instances, the cloud platform can be an external third-party platform, such as Microsoft Azure®, Amazon® web services, IBM® cloud computing, etc. When a LEO accesses application software 252 in order to issue a citation, the IDA 236 can generate an encrypted claims token. The application software 252 can pass this token to every software throughout the system 200. In this manner, security can be maintained throughout the system 200 without requiring multiple authentications. In some instances, when the LEO accesses application software 252 in order to issue a citation, the IDA 236 on application software 252 can determine if that particular LEO has the necessary permissions to access the system 200. In some instances, each LEO is given the same credentials to access system 200 as the credentials for any other government system that the LEO may have access to. In some instances, each LEO may be given a different credential from other government systems in order to access system 200.

In order to aid with the issuance of citations, and to automatically obtain and fill information regarding the offender and the vehicle belonging to the offender, the computing device 250 can be configured to send queries to one or more third-party databases.

The application software 252 can be optionally communicably coupled to a message switch 202 in order to connect with the third-party databases (e.g., third-party databases 104 in FIG. 1). The message switch can convert queries from the computing device 250 into different formats on different protocols. These formats and protocols can correspond to the format of the third-party database on which the query is to be run. The message switch 202 can asynchronously send these queries to the different third-party databases in order to search for information regarding the offender and/or the vehicle belonging to the offender.

The different third-party databases can include, for example, an agency core database 204 (e.g., database associated with a law enforcement agency), database associated with the criminal justice information system (CJIS) network 226, and subscribing LEOs 214. The agency core database 204 includes a person of interest (POI) aggregator 206. The POI aggregator 206 can pull up an offender's record from various databases. For instance, data acquired from the 2D laser barcode scanner 256 by scanning a driver license can be sent via the message switch 202 to be queried against the POI aggregator 206. Put differently, information acquired from a driver license can be queried against the POI aggregator 206 to determine the offenders record. The POI aggregator 206 can be coupled to multiple databases that include information regarding individuals and their criminal record.

The agency core database 204 also includes a VEH aggregator 208. The VEH aggregator 208 can pull up information regarding a vehicle from various databases. For instance, data acquired from 2D laser barcode scanner 256 by scanning a VIN can be sent via the message switch 202 to be queried against the VEH aggregator 208. The VEH aggregator 208 can return vehicle information such as owner of the vehicle, color, manufacturer, etc. Put differently, information acquired from VIN can be queried against the VEH aggregator 208 to determine information regarding the vehicle.

The agency core database 204 also includes geo picker 210. The geo picker 210 can pull up the location of the offender and/or the LEO. For instance, the location sensor 258 can acquire the GPS coordinates of the place where the offence has occurred. These GPS coordinates can be queried against third party address look up APIs to determine both the location of the offense and what jurisdiction law applies to provide the respective applicable statutes to the office to apply to the offense. Additionally, the geo picker 210 can be queried to determine if another dangerous and/or wanted offender that could pose a threat to officer safety has an address that is located close to the GPS coordinates of the offense. In some instances, dangerous and/or wanted persons within an address of 100 feet from the GPS coordinates of the offense can be identified by querying the geo picker 210. In some implementations, this distance can be customizable.

The agency core database 204 also includes warrants systems 212 that can help identify whether the offender has other outstanding warrants/unpaid citations while the current citation is being issued. In some implementations, the warrants system 212 can include access to the warrants records. Warrants records can include two types of records: affidavit warrants that can include offenders who may have a probable cause to be arrested; and bench warrants that include offenders who failed to fulfill one or more court orders. The warrants systems 212 can be queried to identify whether the offender has an affidavit type warrant and/or a bench warrant. Depending on the gravity of the offense, an alert and/or a caution can be transmitted to the LEO.

The CJIS network 226 can include the national crime information center (NCIC) connector 228. The NCIC connector 228 can be a software based connector (e.g., Java® EE connector, etc.) that can connect to the NCIC database and/or the NCIC server. The NCIC database can include property files containing records of stolen articles, boats, guns, license plates, parts, securities, and vehicles. The NCIC database can also include files of offenders and/or persons including supervised release; National Sex Offender Registry; Foreign Fugitive; Immigration Violator; Missing Person; Protection Order; Unidentified Person; Protective Interest; Gang; Known or Appropriately Suspected Terrorist; Wanted Person; Identity Theft; Violent Person; and National Instant Criminal Background Check System (NICS) Denied Transaction. The NCIC database can also include images that are associated with the NCIC records. Therefore, while issuing the citation, the LEO can instruct the application software 252 to query against the NCIC database via the NCIC connector 228 in order to gather further information about the offender. For example, this query can aid the LEO to determine if the offender has committed prior offenses based on the NCIC records. For instance, when the LEO is issuing a citation, following the scanning of the driver license and/or the VIN, information from the scan can be compared against the NCIC database. If the query indicates that the offender has committed prior offenses, as the LEO issues citations, the LEO can also be alerted to this information about the offender thereby placing the LEO on high alert.

The CJIS network 226 also includes a department of motor vehicles (DMV) connector 230. The DMV connector 230 can be a software based connector (e.g., Java® EE connector) that can connect to the DMV database and/or the DMV server. The DMV database can include electronically collected personal information such as a person's name, social security number, physical description, home address, home telephone number, education, financial matters, and/or medical or employment history. The DMV database can also include driver license information and/or identification card information. Examples of this information are true full name, date of birth, physical description, mailing address, residence address, and social security number. The DMV database can also include vehicle registration information such as owner name(s), lien holder name(s), address, vehicle identification numbers, vehicle plate numbers, registration expiration date, make, and type of vehicle. Data acquired from scanning the VIN and the driver license can be queried against the DMV database via the DMV connector 230. Put differently, the application software 252 can connect to the DMV database via the DMV connector in order to query information based on the scans acquired from the 2D laser barcode scanner 256 and/or the other sensors 262. Information from the DMV database can be used to automatically fill data in order to issue the citations.

Subscribing LEOs 214 or law enforcement organizations can opt to offer more information from their databases in order to aid with the issuance of the citations. For instance, information for misdemeanors are usually held by agencies that issue such misdemeanor and may not be available to other agencies. Subscribing LEOs are peer law agencies that can share their databases with other agencies. Therefore, when an LEO is looking up information, in order to access information from other peer agencies (not just the LEOs agency), subscribing LEOs 214 can be accessed. For instance, a LEO who works for the state police may have access to the state police database. However, federal charges may not be stored in the state police database. While issuing a citation, the LEO can choose to query the federal police database via subscribing LEOs 214 in order to determine if there are federal charges against the offender. Via subscribing LEOs, different agencies can share their databases with each other.

An example process of issuing a citation using system 200 can be broken down into four components: the offender's information, the vehicle information, the location of violation, and the charges being pressed. The 2D laser barcode scanner 256 and/or the other sensors 262 can scan a driver license and/or the VIN. Usable person information for the purpose of issuing citation can be queried from the DMV database via the DMV connector 230, the NCIC database via the NCIC connector 228, the POI aggregator 206, and the on-device cache 264. Similarly, vehicle information can be queried from the DMV database via the DMV connector 230, the VEH aggregator 208, and the on-device cache 264.

The location of the violation can be obtained by reverse look up of the GPS coordinates using the location sensor 258 and querying the GPS coordinates against the statute geo picker 210. Once all of the information is collected and/or automatically filled in the application software 252, the LEO can enter the charges against the offender. The offender can sign the citation, and the citation can be printed via a printer connected to the computing device 250 and/or electronically sent to the offender (e.g., to the offender's email, smart phone, etc.). In this manner, system 200 can issue a citation against the offender.

In order to set up a convenient payment method, a payment system 218 (structurally and functionally similar to payment system 118 in FIG. 1) can be communicably coupled to the database 246 of the system 200. Once the citation is issued, the citation will need to be paid and/or pleaded by the offender. The data that is captured by the computing device 250 is pushed to the database 246. This data is then made available to the payment system 218. The payment system 218 includes access to the fines desk 222, the online payment database 220, and the disbursement system 224. One or more of these systems are linked to the clerk and the district attorney's office. An offender can pay the citation fine online via any smart phone. The QR code that is printed on the citation will need to be entered on the smart phone. The online payment database 220 connects the QR code to the appropriate citation and enables the payment of the fine. If the offender chooses to pay the citation fine in person, the fines desk 222 which has access to the data available in database 246 can enable payment in person. In this manner, all of the different servers, databases, and systems are integrated and fed by a single data source which is database 246.

eCitation Operation

Figure 3A:
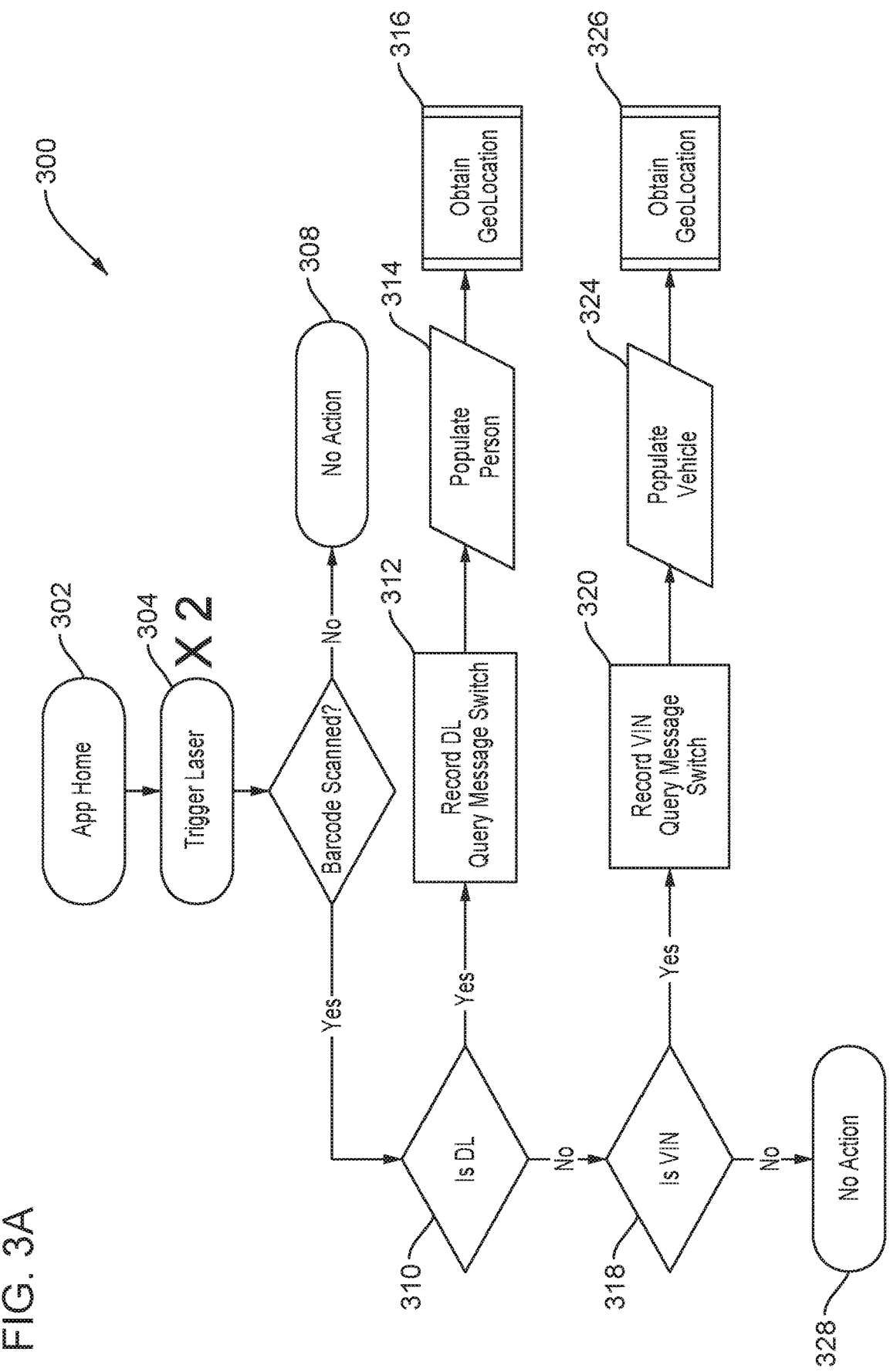
FIG. 3A is a flow diagram illustrating an example first logical flow to issue citations.
Figure 3B:
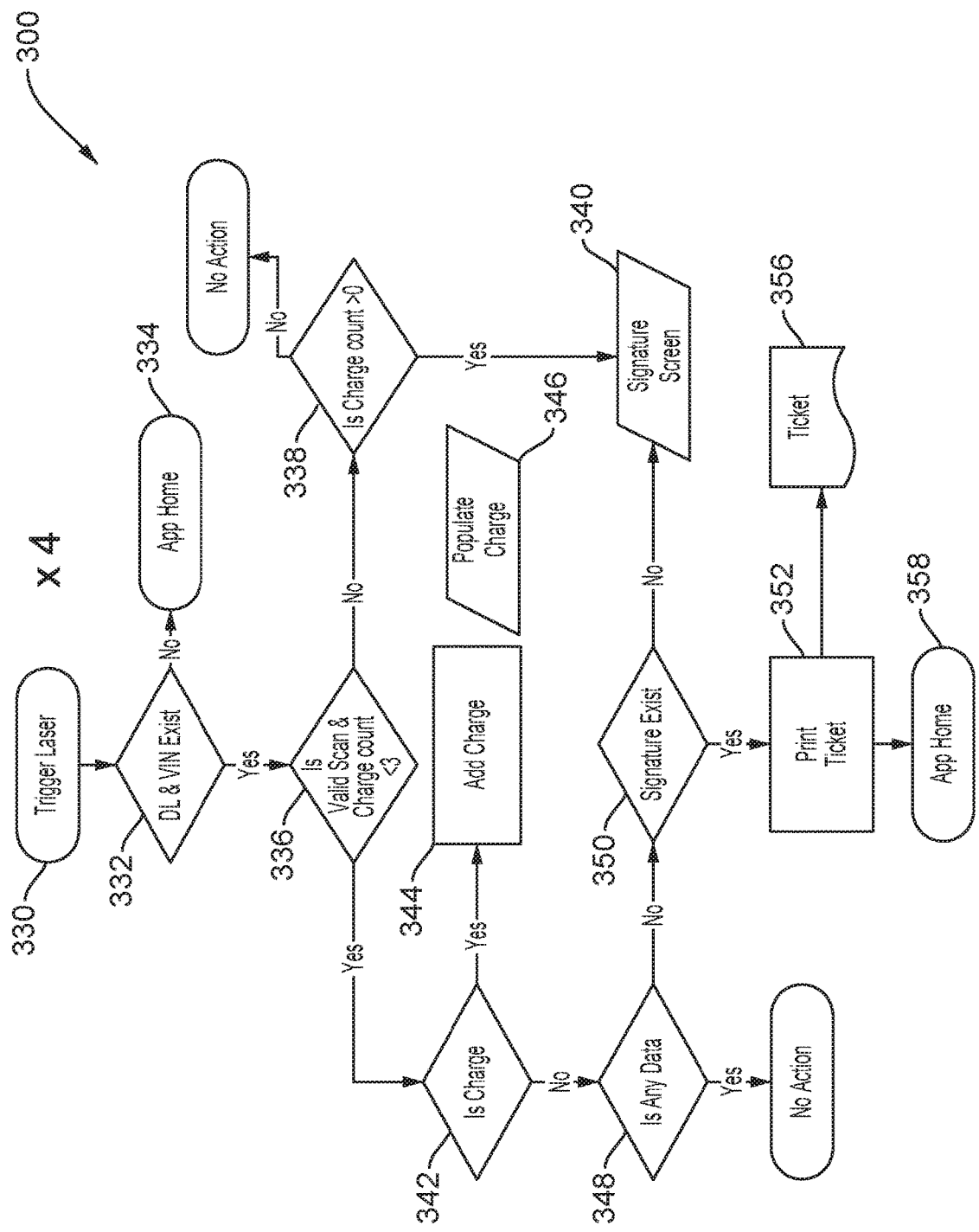
FIG. 3B is a flow diagram illustrating an example second logical flow to issue citations.

FIGS. 3A and 3B are example flow diagrams illustrating a method 300 to issue citations (e.g., using system 100 in FIG. 1 and/or system 200 in FIG. 2).

Method 300 can be broken into two separate processes. In the first process, at 302, the application software application such as application software 252 in FIG. 2 can be rendered on a computing device (e.g., computing device 250 in FIG. 2). At 304, a sensor (e.g., 2D laser barcode scanner 256 in FIG. 2) can be triggered to scan information. The trigger can be based on an input from the LEO. This information can be a barcode on a driver license or a VIN. This information could be any other type of information that the sensor can scan.

At 306, the method 300 determines if the scanned information is a barcode or a machine-readable code. If the scanned information is not a barcode, no further action is taken (at 308).

However, if the scanned information is a barcode, the method 300, first determines if the barcode is related to a driver license (at 310). At 312, if the barcode is related to a driver license, the method 300 will record the driver license. For instance, information associated with the driver license can be stored in an on-device cache (e.g., on-device cache 264 in FIG. 2). At 312, the message switch such as message switch 202 in FIG. 2, can covert the protocol within the data on the driver license to a protocol that can be compatible with third-party databases. The third-party databases can then be queried to find one or more match to the data. For instance, the method 300 can query DMV database via the DMV connector 230 in FIG. 2, the NCIC database via the NCIC connector 228 in FIG. 2, the POI aggregator 206 in FIG. 2, and/or the on-device cache 264 in FIG. 2, to obtain usable information from the driver license.

At 314, using the information acquired in 312, method 300 can populate information regarding the offender. Put differently, the usable information that was obtained from the driver license can be used to populate information regarding the offender. At 316, the method 300 obtains the geolocation of the offender (e.g., via location sensor 258 in FIG. 2).

If the barcode is not related to the driver license, at 318, the method 300 can determine if the barcode is related to a VIN. At 320, if the barcode is related to a VIN, the method 300 will record the VIN. For instance, information associated with the VIN can be stored in an on-device cache (e.g., on-device cache 264 in FIG. 2). At 322, the message switch such as message switch 202 in FIG. 2, can covert the data from the VIN to a protocol that can be compatible with third-party databases. The third-party databases can then be queried to find one or more match to the VIN. For instance, the method 300 can query DMV database via the DMV connector 230 in FIG. 2, the VEH aggregator 208 in FIG. 2, and the on-device cache 264 in FIG. 2, to obtain usable information from the VIN.

At 324, using the information acquired in 322, method 300 can populate information regarding the vehicle. Put differently, the usable information that was obtained from the VIN can be used to populate information regarding the vehicle. At 326, the method 300 obtains the geolocation of the vehicle (e.g., via location sensor 258 in FIG. 2). At 328, if the barcode is neither related to driver license or the VIN, no further action is taken.

In the second process, at 330, the trigger laser is activated. At 332, the method 300 based on the query against the databases (e.g., DMV database, on-cache device, VEH aggregator, NCIC database, POI aggregator, and/or the like), determines if the driver license and the VIN exist. If the driver license and the VIN does not exist, the method 300 reverts back to the application home (at step 334). However, if the driver license and the VIN do exist, at 336, the method 300 determines if the total number of charges against the offender until now is less than a threshold number. This threshold number can be a predetermined maximum number of charges, such as three for example that can be applied to a single citation. The threshold number can differ based on the agency the LEO belongs to. Explained with reference to three maximum charges, if the count of charges against the offender is greater than three, at 338, it can be determined if the count of charges is greater than zero. If the count is greater than zero, at 340, the application software and/or the application reverts to the signature screen.

However, if the count is less than three but greater than zero, at 342, the method 300 determines if the offender needs to be charged. If the offender is to be charged, at 344, the charge is added to the citation and at 346, this charge is populated in the citation. Put differently, at 344, the method 300 determines if the legal violation committed by the offender necessities a charge against the offender. In some instances, the LEO can make this determination based on the LEO's experience. In other instances, one or more databases (e.g., third-party databases 104 and/or on-device cache 164 in FIG. 1) can be queried to determine if the legal violation is a chargeable offense.

If the offender is not to be charged, at 346, the method 300 determines if there is any data regarding the offender (at 348). Put differently, at 348 the method 300 determines if the offender is a first time offender if the offender has been previously charged for an offense. If no data exists in the databases associated with system 200 in FIG. 2, the process determines if a signature of the offender exists (at 350). If no signature exists, the application software and/or the application reverts to the signature screen (340). If however, signature does exist, the citation is printed via a printer connected to the computing device (352).

The trigger laser in the first logic sequence can be activated twice to populate person information and vehicle information. Once both those parameters are obtained, every subsequent trigger can place the method 300 in the second logic sequence to determine the other parameters or take respective actions. In the second process of FIG. 3B, a minimum of 4 loops may be required to obtain all relevant information to create a citation.

Seamless Operation of System 200 in Absence of Network Connectivity

A desirable performance goal of the system 200 to issue citations is to maximize automated data entry. As discussed above, by maximizing the automated data entry process the LEO does not have to manually enter all of the data that is needed for the citation. Additionally, the LEO spends less time looking at the screen and therefore is less distracted during the process of issuing the citation. This also reduces the time taken to issue the citation and makes the process of issuing citation simple and easy.

This can occur when the computing device is connected to a network and even when the computing device does not have network connectivity that is available. This is desirable for two scenarios; querying the information to facilitate quick data input to complete a citation and saving or persisting of data both in case of network connectivity and disconnected state transparently.

Figure 4:
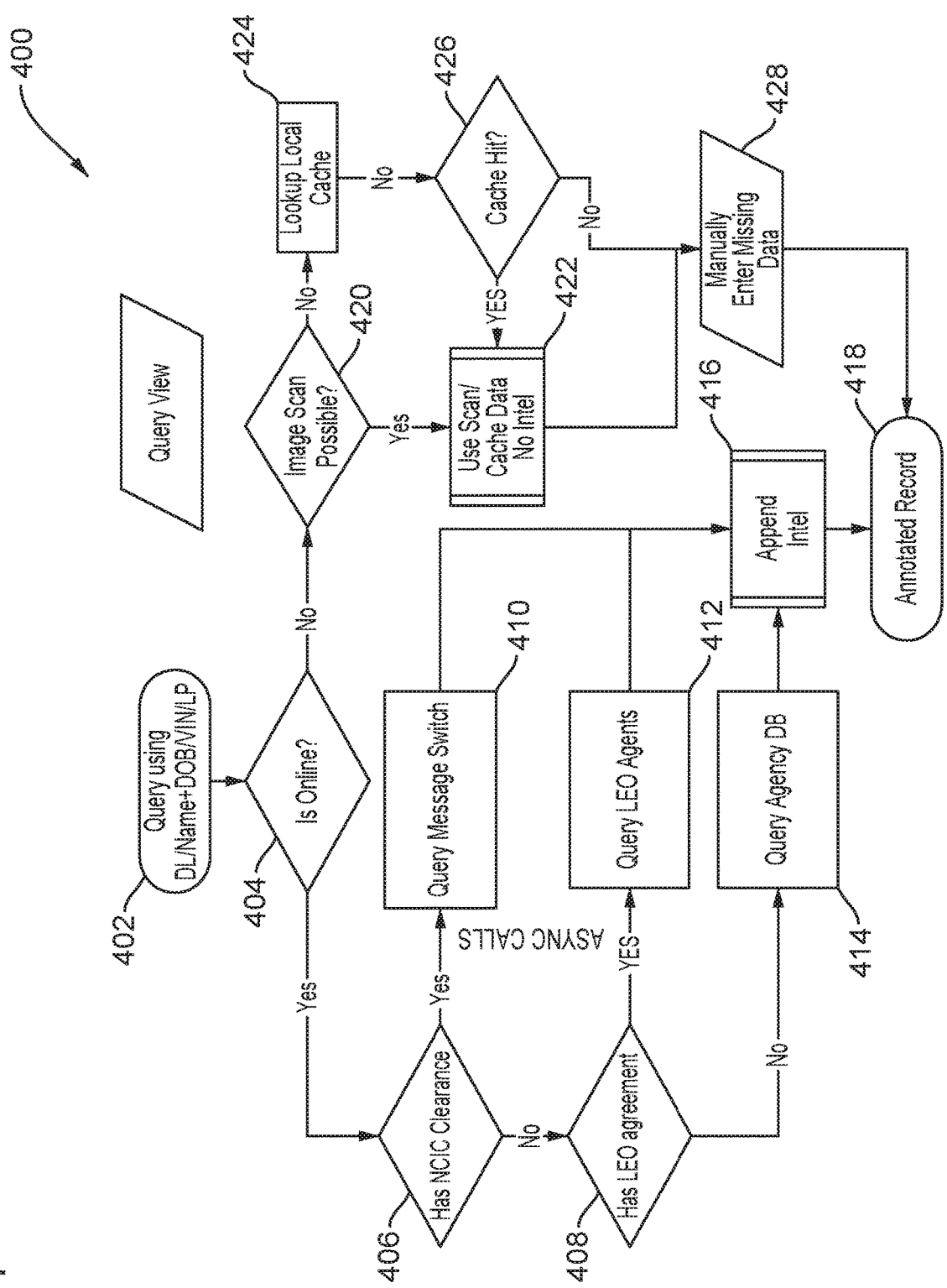
FIG. 4 is a flow diagram illustrating an example method for querying databases in the presence and in the absence of network connectivity.

FIG. 4 is a flow diagram illustrating a method 400 for querying third-party databases (e.g., third-party databases 104 in FIG. 1) in the presence and in the absence of connectivity to a network (e.g., Internet). At 402, the method 400 can use query parameters such as driver license number, VIN number, a combination of the offender's first and last name with their date of birth etc., that are obtained from scanning the barcode on the driver license and the VIN. Alternatively, these query parameters can be manually entered by a law enforcement officer.

At 404, a determination is made about whether the computing device is connected to a network. Put differently, a determination can be made on whether the computing device is connected to both the Internet and (optionally) the message switch (e.g., message switch 202 in FIG. 2). If the method 400 determines that connectivity exists, at 406 and 408, based on the offender's information and the security rights, asynchronous calls can be made to the NCIC interface and/or other law enforcement agencies. If a call is made to the NCIC interface (at 406), then at 410, the message switch can perform a query against the NCIC database to obtain further information regarding the offender and/or the vehicle.

However, if the call is made to the LEO agency (at 408), then at 412, other agencies (i.e., the agencies with which the LEO's agency has a memorandum of understanding, such as other similar state agencies) can be queried to obtain information regarding the offender and/or the vehicle. Similarly, at 414, the LEO's agency database can also be queried to obtain information regarding the offender and/or the vehicle.

Once all the information has been collected, the intelligence can be appended to the offender's record and can be presented to the LEO to provide situational insight (at 416 and 418).

Figure 5:
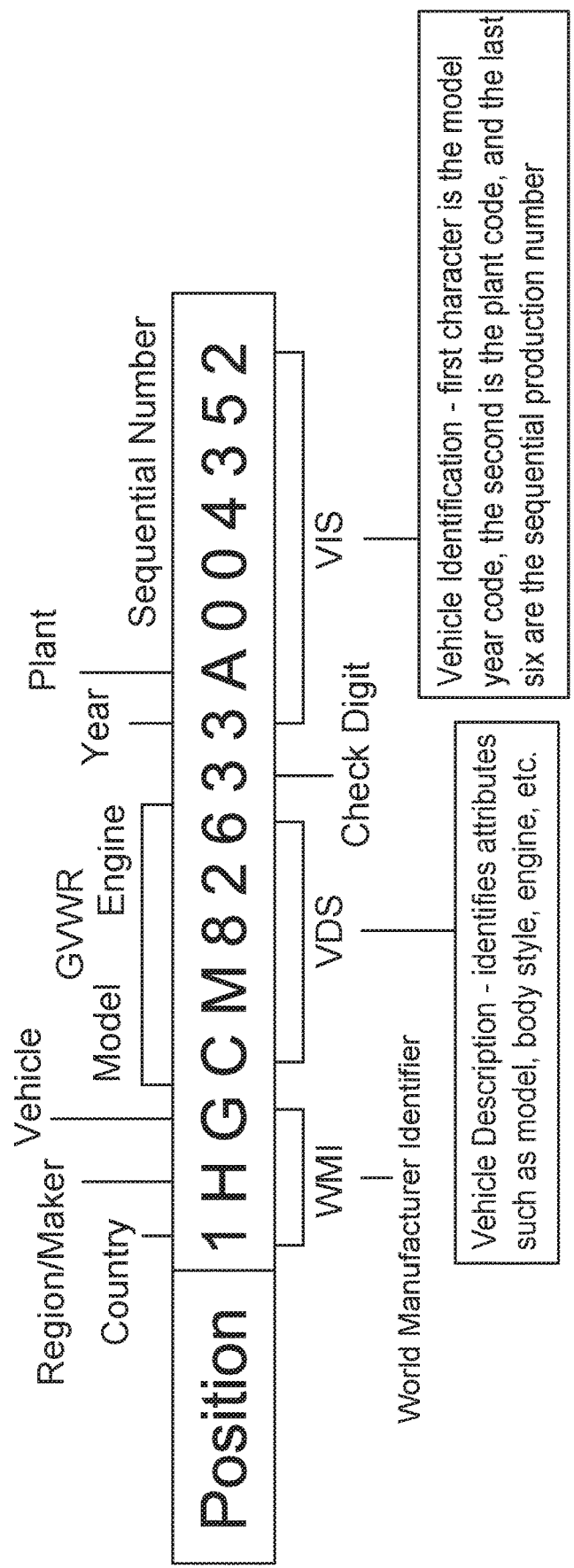
FIG. 5 illustrates an example vehicle identification number (VIN) and the information that can be obtained from a VIN.

However, if method 400 determines that the computing device is not connected to a network, the method 400 still tries to decipher as much information as possible from the scanned data (i.e., the scanned barcodes of the driver license and VIN) so as to fill the maximum number of fields for the LEO. For instance, the VIN scan for a vehicle can itself be used to automatically fill field such as manufacturer model and year of manufacture of the vehicle (see FIG. 5 for information that can be obtained from the VIN) by looking up the VIN against an on-device cache. For instance, in FIG. 5, the number "3" represents the year of manufacture. The number "3" in a VIN translates to the year "2003" per the VIN standard established by the National Highway Traffic Safety Association of the United States. Some other standards include country code (e.g., country code "1," "4," or "5" represents United States), vehicle descriptor section (represented from the fourth to ninth position on the VIN), etc. Therefore, by looking at the VIN, it can be determined that the example VIN shown in FIG. 5 is of a vehicle that was manufactured in 2003.

Therefore, at 420, the method 400 determines if an image scan of the barcode is possible. If an image scan is possible at 422, the information from the scan can be queried against the on-device cache on the computing device. If the image scan is not possible, then at 424, the VIN and the driver license itself can be used to query against the on-device cache on the computing device. If the data regarding the offender and/or the vehicle exists in the on-device cache, this data can be used to append the intelligence to the offender's record. However, if the data regarding the offender and/or the vehicle does not in the on-device cache, at 428, the LEO can manually enter the missing data.

Even though no intelligence is available through online servers the method 400 still assists the LEO by filling in as much information available from the barcodes pair. Similarly, data obtained from a mere scan of a driver license can be enough to complete most of the fields required to enter a user information for the citation record.

Figure 6:
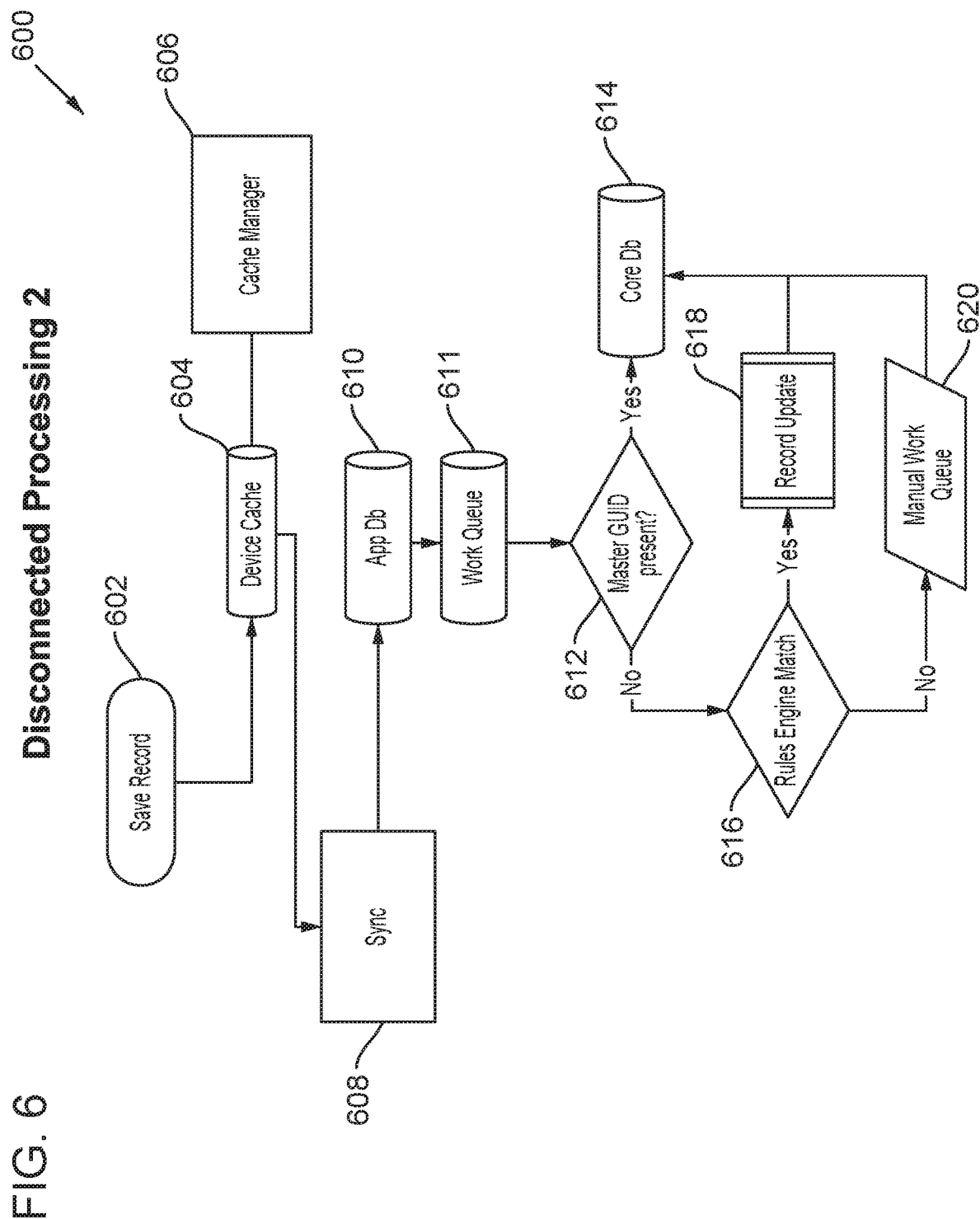
FIG. 6 is a flow diagram illustrating an example method of saving the data collected during the citation process.

FIG. 6 is a flow diagram illustrating the method 600 of saving the data collected during the citation process. At 602 and 604, the information recorded after issuing of a citation can be saved to a local cache database (i.e., on-device cache such as on-device cache 264 in FIG. 2) on the computing device. If the computing device does not have a persistent connection to the network, at 606, the information stays in the cache of the computing device till a connection is made.

Once the computing device is connected to the network or through a manual trigger, at 608, the sync process transparently synchronizes and pushes the data from the on-device cache to the application database on the servers or in the cloud (e.g., database 246 in FIG. 2) (at 610). The synchronization engine is also responsible to download any needed data such as those used in a dropdown lists like the list of states to speed up the citation process.

Once the synchronization is successful, the on-device cache data is stored in the app database. The sync engine then works in the database (e.g., database 246 in FIG. 2) to determine correlation of the records to historic records and attempts algorithmically to relate the new entries to all records based on certain subset of common and same pieces of information in each record. For instance, if a master globally unique identifier is present, at 612, the new entry is stored in the core database (at 614). However, if a master globally unique identifier is not present, at 616, the rules engine determines the correlation of the new entries to the historic records. If a match is present, at 618, the record is updated and saved in the core database. However, if a match is not present, the new records are flagged and placed in a manual queue (at 620). A database administrator can later on determine if those records are entirely new or that there may be a connected to an old record and direct them forward respectively.

Security of LEO

Figure 7:
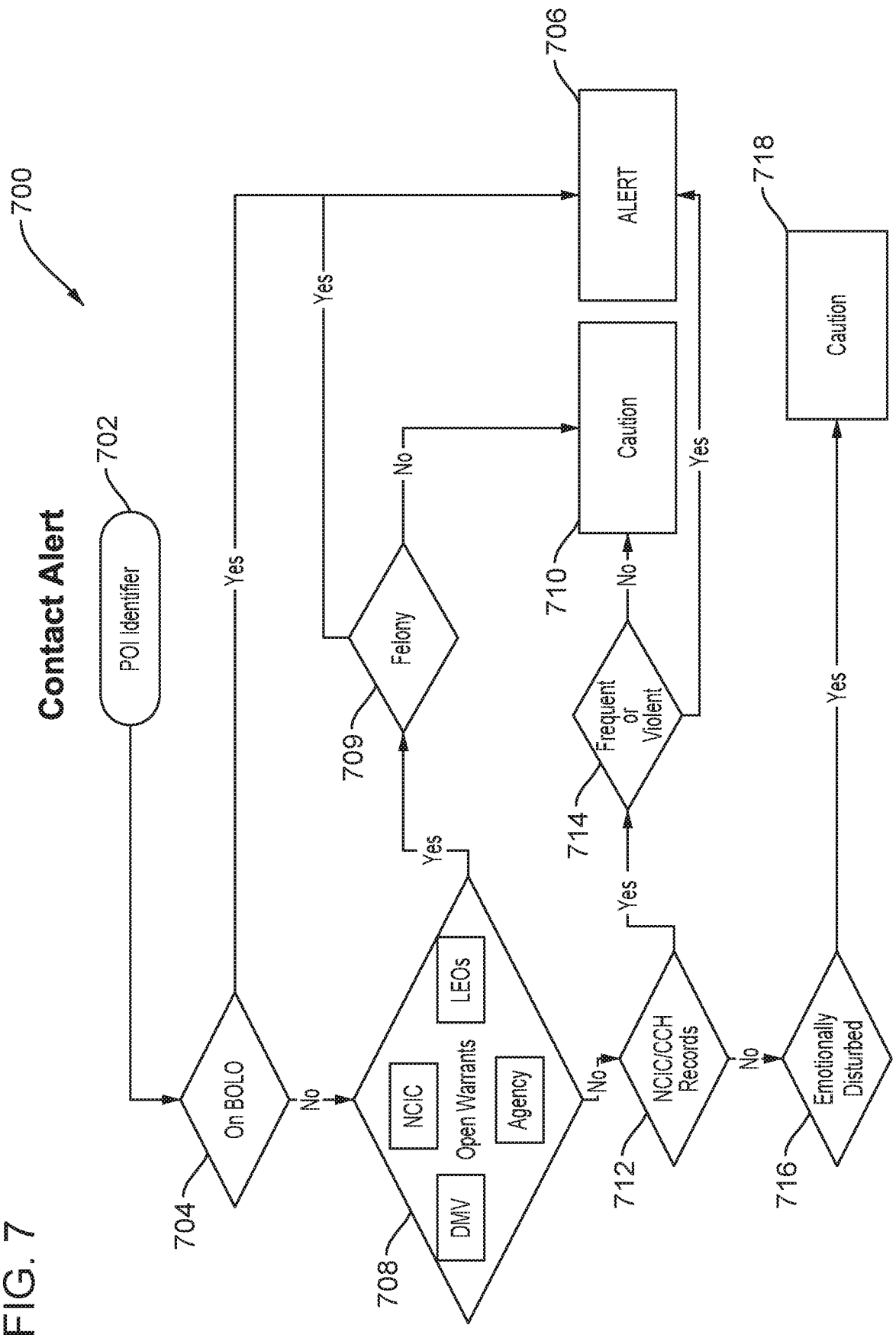
FIG. 7 is a flow diagram illustrating an example method that ensures the security of LEOs.

FIG. 7 is a flow diagram illustrating method 700 that ensures the security of the LEOs.

When a LEO starts the citation process (e.g., following the method 300 in FIG. 3A and FIG. 3B), at 702, the person of interest or the POI identifier information can be passed through a series of checks to evaluate the risk factor associated with suspect the LEO is making contact with. At 704, a check is made across a Be on Look Out list (BOLO) to ensure the suspect is not on an ad hoc immediate watch list. BOLO is provided to the LEOs by police dispatchers based on specific criminal intelligence. If the suspect is on that list the process 700, at 706, quickly alerts and presents the bolo information to the LEO to take appropriate action.

If the suspect is not on the BOLO list, at 708, the POI identifier can be used to run multi asynchronous queries across different databases to search for any wanted or open warrants information. These can be, for example, NCIC warrant queries on the NCIC database, DMV's database, collaborating agencies network system (e.g., Subscribing LEOs 214 in FIG. 2) for misdemeanor summons, and/or the LEO's own agency. If any warrants are found, and if the severity is a felony, at 706, the LEO is alerted. If the severity is not a felony, the LEO at 710 is issued a caution. An alert and a caution can be distinguished on an application software based on the color. For instance, an alert can be issued as a red icon while a caution can be issued as a yellow icon on the user interface (e.g., user interface 168 in FIG. 1) of the application software.

If no warrants are found, at 712, a search is done on criminal history databases (e.g., NCIC database, POI aggregator, etc.) to ascertain if the suspect has any criminal history. Depending on the nature of the history record and frequency of such records (at 714) a caution (710) or alert (706) is issued to the LEO.

Additionally, at 716, the process 700 also checks the BOLO list for flags such as emotionally disturbed, medical condition, and intimate partner violence history to caution the LEO so that the officer is better prepared for the situation. As discussed above, the caution can be issued as a yellow icon on the user interface of the computing device.

Geo Alerting

Figure 8:
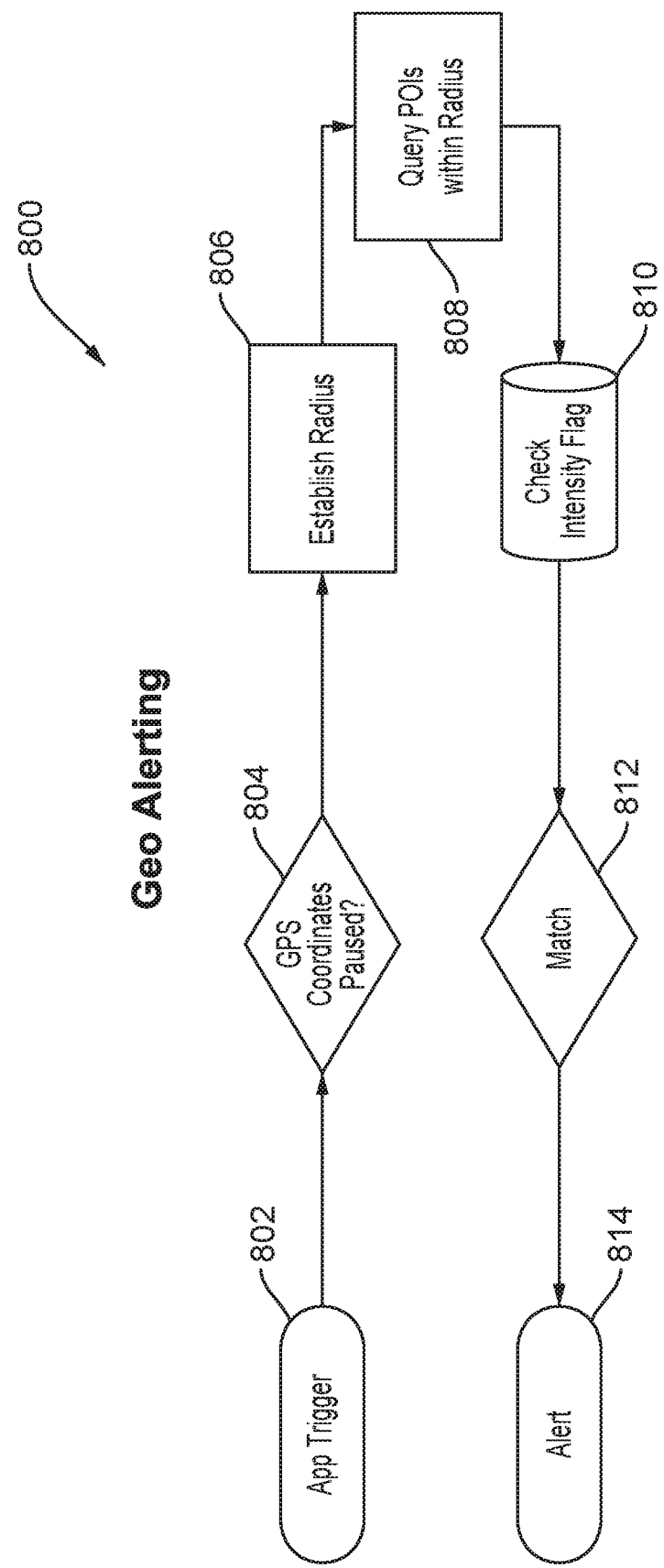
FIG. 8 is a flow diagram illustrating an example method to proactively alert a LEO where needed.

FIG. 8 is a flow diagram illustrating process 800 to proactively alert a LEO where needed based on Geo alerting. The Geo location chip and/or software based triangulation can be used to program the application software on the computing device so as to alert the LEO proactively when needed. At 802, a determination, triggered by application software usage, can be made of the participation level of the officer in a situation. For instance, using a microphone (e.g., other sensors 262 in FIG. 2), in conjunction with a speech engine and/or API, the audio interaction between the LEO and the offender can be transcribed. The participation level of the officer can be made based on the audio and the amount of time of the interaction between the officer and the offender. In another non-limiting example, by using a gyroscope sensor (e.g., other sensors 262 in FIG. 2), the participation level can be determined based on the motion of the officer. For instance, vigorous motions can be classified as high participation level, while still motions can be classified as low participation level. At 804, the GPS coordinates are queried to determine if the LEO has been in a certain location for a certain length of time. For instance, if the LEO's position has not changed significantly in 5 minutes, it can be assumed that the officer is stationary and conducting a stop. For instance, if the LEO's position is within a 200 feet radius of an initial position measurement, then it can be assumed that the officer is stationary. If application software is used in such a state, process 800 can be triggered.

At 806, once the required parameters are met, a pre-configured radius can be established. For example, the pre-configured radius could be set to a default of 200 feet. The POI aggregator (e.g., the PO aggregator 206) can then be queried at 808 to identify past persons of interest who have an address or associated location within that radius. At 810, these persons of interest are then checked for flags based on the type and frequency of historic records to determine if one or more such people could be a potential threat to the LEO. If such a threat is established (at 812) the LEO can be alerted at 814 to be cautious of his/her surroundings. The alert can be provided on the user interface (e.g., user interface 168) of the computing device. For instance, a red icon representing the alert may be provided on the user interface.

Distribution and Collections

Figure 9:
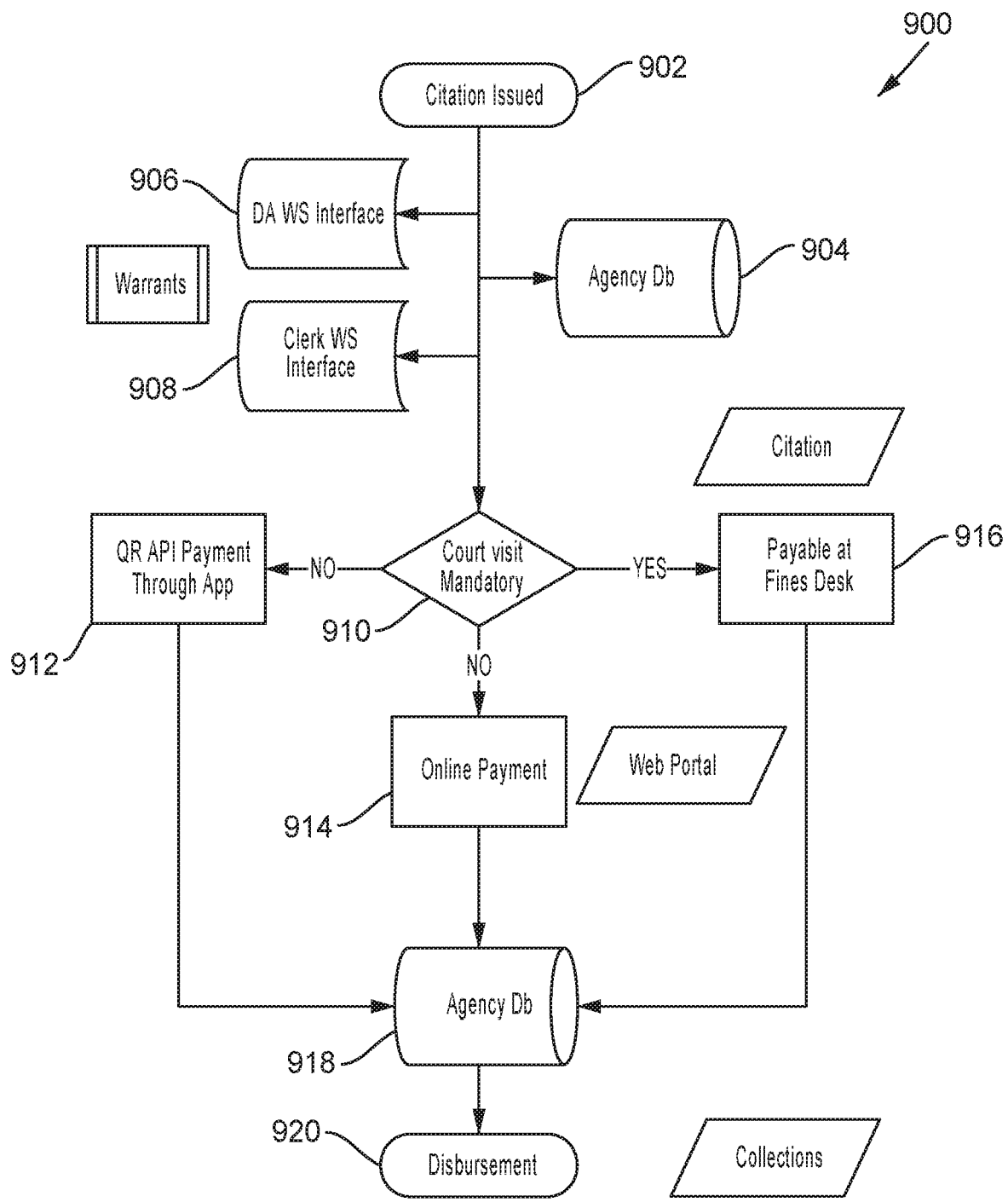
FIG. 9 is a flow diagram illustrating an example method of collecting payments following the issuance of a citation.

FIG. 9 is a flow diagram illustrating the method 900 of collecting payments following the issuance of a citation. In some implementation, method 900 can be implemented during the issuance of the citation. Method 900 may be implemented by a payment system, such as payment system 118 in FIG. 1 and/or payment system 218 in FIG. 2. In some implementations, during the issuance of the citation, the data is stored in the system's database (e.g., database 246 in FIG. 2) (at 904), systems and/or databases of partner agencies such as district attorney's office (at 906) and clerk of court (at 908) can tap into this database to get simultaneous data feeds from the database. The data feed can be provided via a Web Services interface. The querying agencies can be provided with a metadata of feed which they can chose to query as frequently or in real-time to pull information for their corresponding record keeping.

At 910, the citation that is issued can be evaluated against the statutes to determine if there are any requirements which prohibit the offenders to pay them directly. If the citation is deemed payable, the process 900 can provide for two mechanisms for the offender to pay the citation.

When the citation includes a QR bar code that is printed on it, it is deemed at 912 that the citation can be directly paid through an application using a credit card or online bank account. The QR code can be dynamically built with violation ID information thereby allowing an offender to scan the QR code directly and pull up their violation record on their smart phone devices. Put differently, when the citation is issued a machine readable code, such as a QR code can be printed on the citation. The QR code can be associated with a violation ID that represents the legal violation committed by the offender. Therefore, when an offender scans the QR code, considering that the violation ID is already associated with the QR code, the violation record corresponding to the violation ID can be pulled up. This allows the offender to pay the citation directly through their smart phone device using a credit card or online bank account.

Another option includes the option for the violator to pay the violation online (at 914) through a webpage by identifying necessary information such as citation number and date of birth.

At 916, it is deemed that the citation, by virtue of the statute(s), is not immediately payable and that the offender will have to make a mandatory court appearance and to pay a fine in person.

In some implementations, the three mechanisms 912, 914, and 916 can be implemented before the citation is issued. Steps 918 onwards may be implemented following the issuance of the citation. Put differently, the citation can also include the method of payment based on steps 912, 914, and 916. The offender can then follow steps 918 onwards to make the payment.

In some implementations, the three mechanisms 912, 914, and 916 can be implemented after the citation is issued. In such cases, the citation declares that a payment may be required. Evaluation of the method of payment (i.e., steps 912-916) can be made after the citation is issued.

Irrespective of the three mechanisms 912, 914, 916 through which a fine is paid, the payment is recorded, once made into a collection system (e.g., payment system 118 in FIG. 1 and/or payment system 218 in FIG. 2) that updates the agency database (at 918) and along with any partner agency interfaces. For instance, the databases associated with the clerk's office, the LEO's agency, district attorney's office, etc. can be updated to reflect that the payment has been made. Therefore, without manual updates, the databases of one or more partner agencies can be automatically updated in real time thereby streamlining the process of issuing citations. This streamlining also allows the violators to pay their citations till the very last moment of the court date. The process of managing separate databases and building separate databases with each partner agency can be eliminated and/or the syncing therebetween can be simplified.

Additionally the collection system can be programmed with various governmental agencies that shares the proceeds from such traffic citation fines. The collection system can use understanding of the disbursement logic to disperse the amounts amongst various agencies. For instance, the payment system, such as payment system 118 in FIG. 1 and/or payment system 218 in FIG. 2 can maintain a specification of how the fine is to be shared between the different agencies. For example, the payment system can maintain the percentage of fine that the law enforcement agency, the district attorney's office, and the clerk's office should get. This percentage can change based on the type of legal violation, nature of payment (e.g., online vs. in court), etc.

Although the citations described herein illustrate examples of traffic violation and/or vehicle related tickets, it should be understood to a person of ordinary skill in the art, that these citations can be any other citation. The information filled and queried can be one of or both of personal information regarding the offender and information regarding the vehicle associated with the offender.

Example User Interfaces

Figure 10:
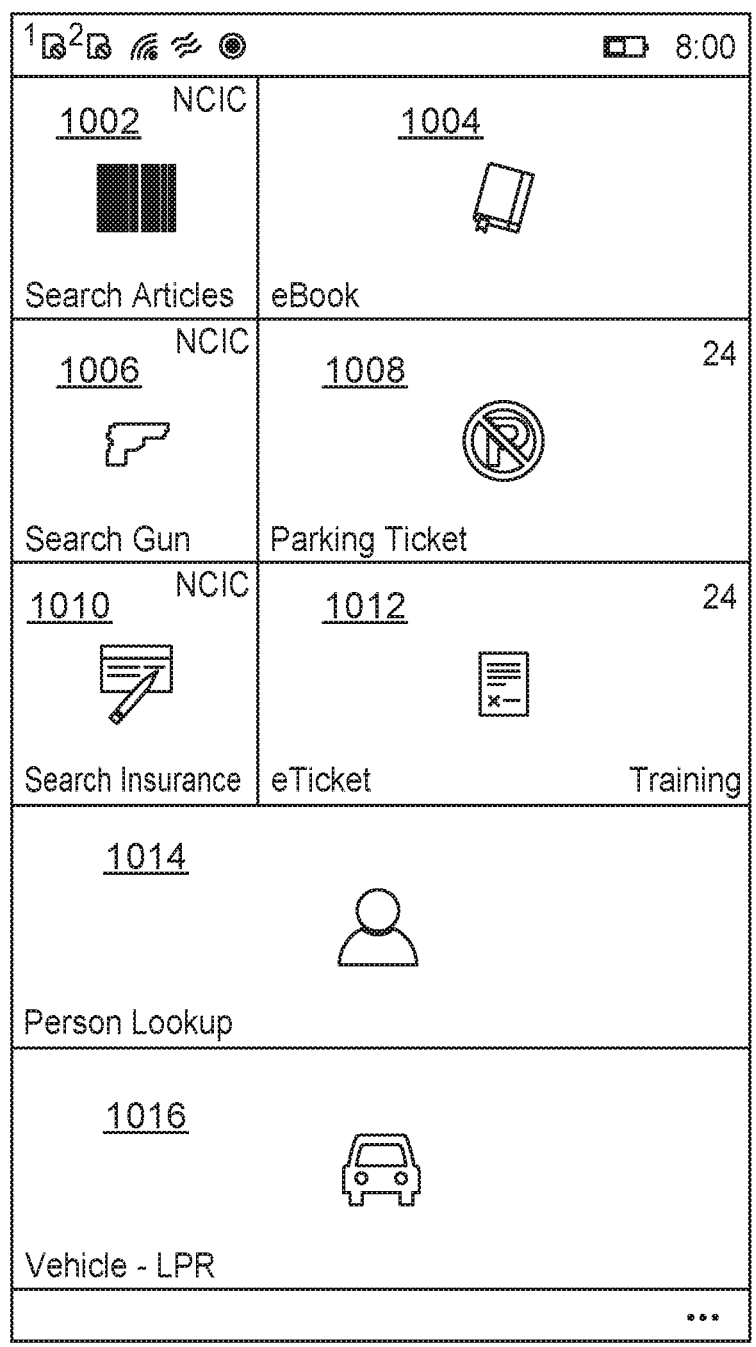
FIG. 10 is an image of an example display on the user interface of a computing device that can issue citations.

FIG. 10 is an is an image of an example display 1000 on the user interface of a computing device that can issue citations. The user interface (e.g., user interface 168 in FIG. 1) can be displayed on the computing device (e.g., computing device 150 in FIG. 1 and/or computing device 250 in FIG. 2). In some instances, opening an application software (e.g., application software 252 in FIG. 2) can render the user interface with display 1000 on the computing device. A LEO can navigate through different functions to issue citation from display 1000. For example, a LEO can look up articles 1002, guns 1006, and/or insurance 1010 associated with an offender by querying a NCIC database via a NCIC connector (e.g., NCIC connector 228). The LEO can look up information regarding the offender by navigating to "person look up" 1014.

Figure 12:
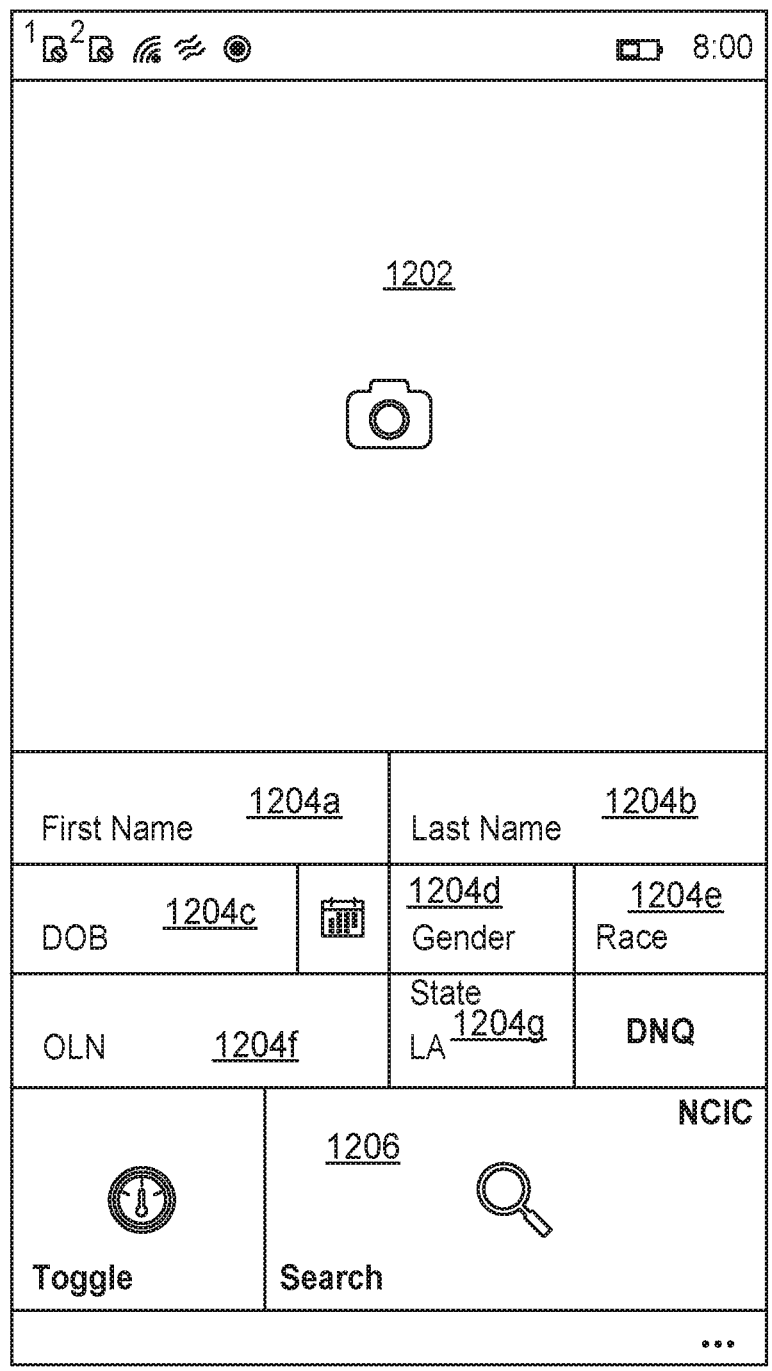
FIG. 12 is an image of an example display on the user interface of a computing device to look up personal information regarding the offender.

Clicking/pressing/tapping "person look up" 1014 can provide the LEO access to a display such as display 1200 in FIG. 12 to enable the LEO an opportunity to look up personal information regarding the offender.

In a similar manner, the LEO can also look up information regarding the vehicle by navigating to "vehicle-LPR" 1016. By clicking/pressing/tapping "vehicle-LPR" 1016 can provide the LEO access to a display such as the display 1100 in FIG. 11 to enable the LEO an opportunity to look up information regarding the vehicle associated with the offender. If the legal violation is related to a parking violation, the LEO can click/press/tap "parking ticket" 1008 to issue a parking ticket. If a determination can be made that an electronic ticket can be issued as a citation, then the LEO can click/press/tap "eticket" 1012 to issue an electronic ticket.

Figure 11:
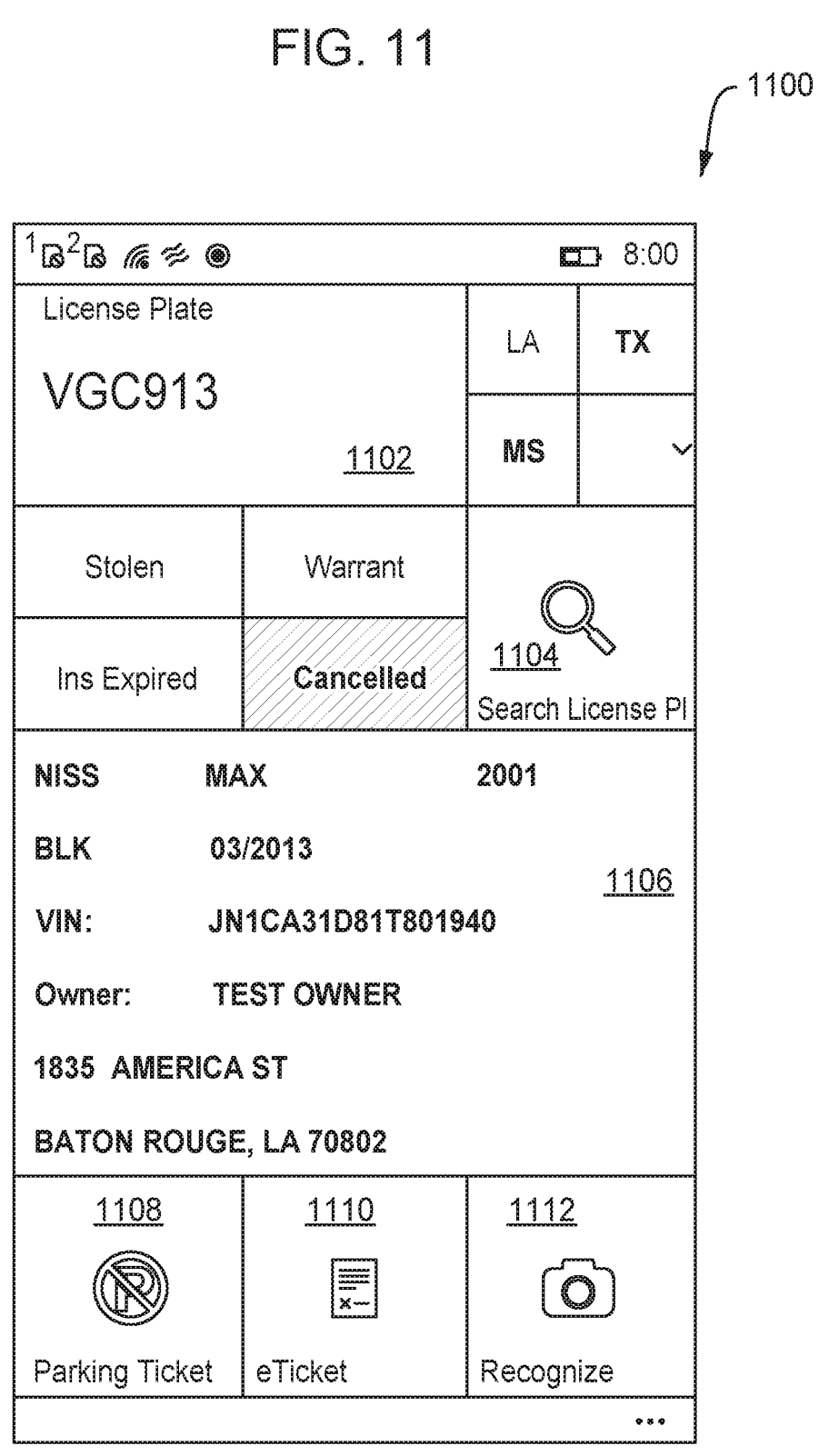

FIG. 11 is an image of an example display 1100 on the user interface of a computing device to look up information regarding a vehicle associated with an offender. The license number can be filled in 1102. The license number may be automatically filled by scanning a license plate and/or a VIN (e.g., VIN 1106 in FIG. 11) using an optical scanner (e.g., optical sensor 156 in FIG. 1) or the license number can be manually entered by the LEO. The information regarding the vehicle can be queried by clicking/pressing/tapping "search license plate" 1104 in display 1100. This can provide access to databases such as agency database (e.g., agency database 204 in FIG. 2), subscribing LEOs database (e.g., subscribing LEOs 214 in FIG. 2), DMV database via a DMV connector (e.g., DMV connector 230 in FIG. 2) to gather information regarding the vehicle. In some instances, an image of the vehicle can be taken via 1112 to further query information regarding the vehicle using image recognition techniques. If the LEO is to issue a parking ticket or an electronic ticket to the offender, the LEO can do so by clicking/pressing/tapping 1108 and 1110 respectively.

FIG. 12 is an image of an example display 1200 on the user interface of a computing device to look up personal information regarding the offender. One or more personal information regarding the offender, such as name, date of birth, etc. (e.g., 1204a-1204g) can be automatically filled by either a) taking a picture of the offender by clicking/tapping/pressing 1202. 1202 can access an image sensor such as a camera on the computing device to take the picture of the offender. This picture can be queried against one or more databases (e.g., third-party databases 104 and/or on-device cache 164 in FIG. 1) to automatically fill information regarding the offender; or b) by scanning a driver license using a an optical scanner (e.g., optical sensor 156 in FIG. 1). Information from the driver license can be used to automatically fill information 1204a-1204g. In some instances, all of the personal information 1204a-1204g may be manually filled by a LEO. In some instances, some of the personal information that could not be automatically filled may be manually filled by the LEO. Information regarding the offender can be queried from the NCIC database (e.g., 1206 in FIG. 12) via an NCIC connector.

Once the personal information is filled and personal information regarding the offender is queried against one or more databases (e.g., third-party databases 104 and/or on-device cache 164 in FIG. 1), this information can be displayed on the computing device. For example, FIG. 13 is an image of an example display 1300 of the personal information of an offender on the computing device. As seen in FIG. 13, following filling the information and querying the filled information, the system, such as system 100 in FIG. 1 and system 200 in FIG. 2, can gather personal information such as name, date of birth, address, and past offenses that can be displayed on the user interface of the computing device.

FIG. 14 is an image of an example display 1400 on the user interface of a computing device to enable a LEO to issue citation. For instance, once the LEO identifies the legal violation committed by the offender, the LEO can issue a citation using display 1400. Display 1400 presents the LEO with different options corresponding to different violations.

FIG. 15 is an image of an example display 1500 to input location of the offense on the user interface of the computing device. The display 1500 can display locations that can be favorited by the LEO. Additionally, the display 1500 can display the last three locations that the LEO accessed the application software on the computing device. In some instances, the location can be inputted manually by the LEO. In some instances, the location can be automatically filled using a location sensor such as location sensor 158 in FIG. 1.

Figure 16:
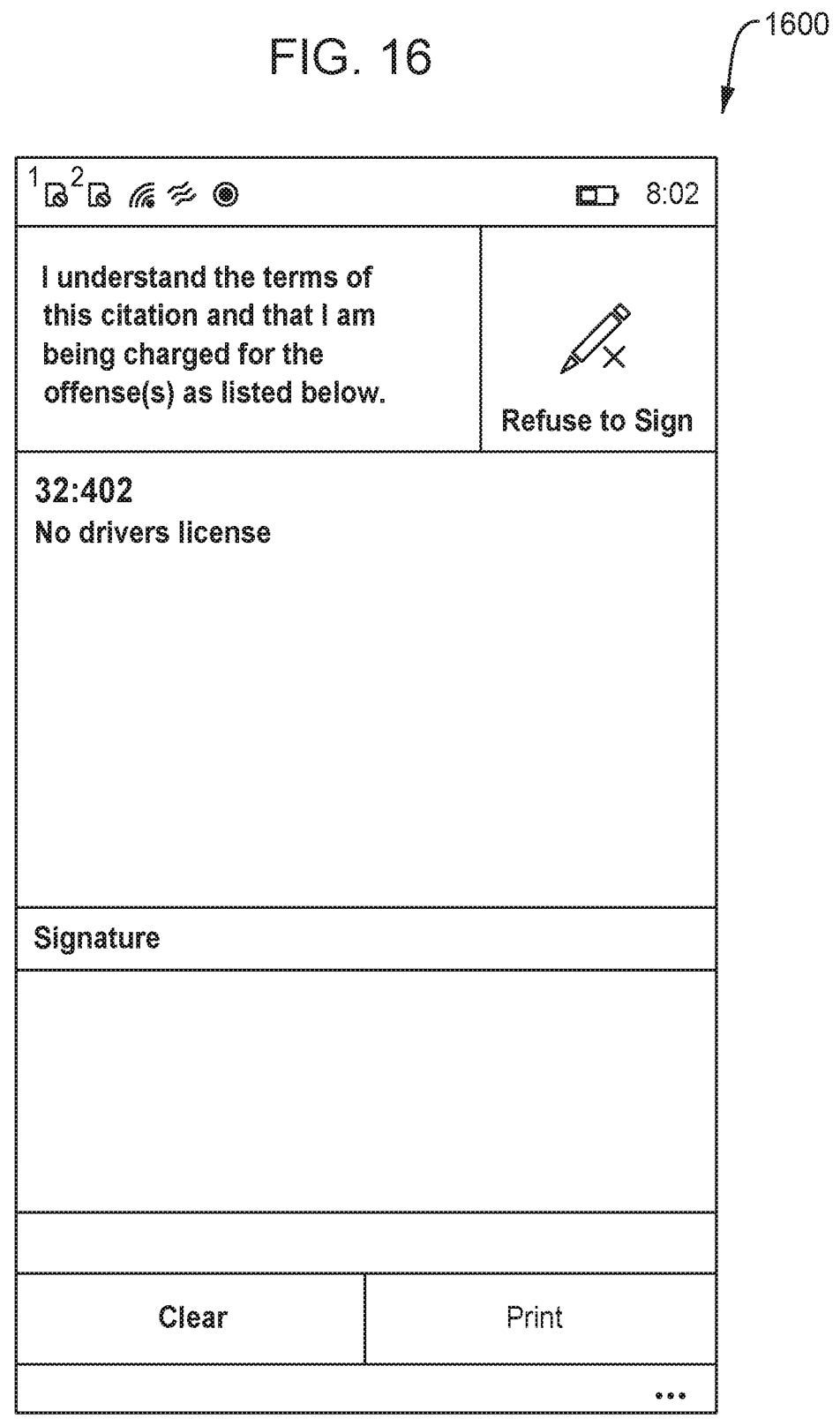

FIG. 16 is an image of an example display 1600 of a signature page on the user interface of the computing device. Following the issuance of the citation, the offender can sign the citation via the application software (e.g., application software 252 in FIG. 2) on the computing device.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for issuing, by an officer, a ticket to an offender for committing at least one legal violation, the system comprising:
   a first database including location-specific legal information, the location-specific legal information specifying remedial options available for each legal violation of a plurality of legal violations in a predetermined geographic area; and
   a handheld device communicably coupled to the first database and associated with the officer, the handheld device including:
      an optical scanner;
      a location sensor;
      a user interface for the officer to interact with the handheld device;
      a network interface; and
      a controller executing one or more instructions to:
         acquire, upon input from the officer based on an interaction with the user interface, via the optical scanner, personal information associated with a driver license of the offender;
         acquire, upon input from the officer, via the optical scanner, vehicle information associated with a vehicle associated with the offender and with the at least one legal violation;
         receive, from the officer via the user interface, an indication of the at least one legal violation; and
         without further input from the officer, generate the ticket by:
            acquiring, via the location sensor, location information associated with the handheld device;
            querying, via the network interface, one or more second databases with the personal information and receiving, in response to said querying, at least a portion of person identification information of the offender;
            querying, via the network interface, one or more third databases with the vehicle information and receiving, in response to said querying, at least a portion of vehicle identification information of the offender;
            querying, via the network interface, the first database with the indication of the at least one legal violation and receiving, in response to said querying, a specification of a first remedial option of a set of remedial options associated with the at least one legal violation; and
            generating the ticket including the personal identification information, the vehicle identification information, the at least one legal violation, an indication of the first remedial option, and a field to receive a signature of the offender;
         receive the signature of the offender to generate an executed ticket; and
         transmit an indication of the executed ticket to one or more of a printing device, a handheld device associated with the offender, or an email account associated with the offender.

2. The system of claim 1, wherein the executed ticket is a first executed ticket, further comprising a memory communicably coupled to the controller, to store a set of executed tickets, including the first executed ticket, generated via the handheld device.

3. The system of claim 2, wherein the portion of the person identification information is a first portion of the person identification information, wherein the processor is further configured to query the stored set of executed tickets to identify a second portion of the person identification information.

4. The system of claim 2, wherein the portion of the vehicle identification information is a first portion of the vehicle identification information, wherein the processor is further configured to query the stored set of executed tickets to identify a second portion of the vehicle identification information.

5. The system of claim 4, wherein the vehicle identification information is a unique vehicle identification number (VIN), wherein the memory stores a VIN reference table, and wherein the processor is further configured to identify the second portion of the vehicle identification information based on the VIN reference table.

6. The system of claim 1, wherein the vehicle information is a license plate number associated with the vehicle, and wherein the one or more third databases includes a motor vehicle database.

7. The system of claim 1, wherein the processor is further configured to generate the ticket by generating a unique ticket number, wherein the generated ticket includes the unique ticket number.

8. The system of claim 1, wherein the indication of the first remedial option includes a machine readable code, wherein the processor is further configured to generate the ticket by generating the machine readable code based on the specification of the first remedial option received from the first database.

9. The system of claim 8, wherein the processor is further configured to generate the ticket by generating a unique ticket number, and wherein the machine readable code includes the unique ticket number.

10. The system of claim 1, wherein the indication of the first remedial option includes an indication of electronic payment.

11. The system of claim 1, wherein the indication of the first remedial option includes an indication of a requirement for court appearance.

12. The system of claim 1, wherein the optical scanner includes a camera or a barcode scanner.

13. The system of claim 1, wherein the location sensor is a global positioning system (GPS) sensor.

14. The system of claim 1, wherein the controller is further configured to, during the generating the ticket:
   query, via the network interface, one or more fourth databases with the personal information and receiving, in response to said querying, search results associated with the offender; and
   present, via the user interface, an indication of the search results to the officer.

15. The system of claim 14, wherein the one or more fourth databases includes a watch list for persons of interest, and the search results are indicative of the presence of the offender on the watch list.

16. The system of claim 14, wherein the one or more fourth databases includes a warrants database, and the search results are indicative of one or more warrants associated with the offender.

17. The system of claim 14, wherein the one or more fourth databases includes a crime database, and the search results are indicative of criminal events associated with the offender.

18. The system of claim 14, wherein the one or more fourth databases includes a mental health database, and the search results are indicative of mental health events associated with the offender.

19. The system of claim 14, wherein the indication of the search results include one or more of an alert, a warning, and a caution.

20. The system of claim 1, wherein the first database stores person of interest information for a set of persons of interest including, for each person of interest, an address or last location associated with that person of interest,
wherein the controller is further configured to, during the generating the ticket:
monitor the location sensor to determine when the officer has been at a current location of the handheld device for greater than a predetermined time period;
identify a predetermined radius around the current location;
query the first database to identify a first person of interest having an associated address or associated last location within the predetermined radius; and
present, via the user interface, an indication of the first person of interest to the officer.

21. The system of claim 20, wherein the controller is further configured to, during the generating the ticket:
query, via the network interface, one or more fourth databases with identifying information for the first person of interest and receiving, in response to said querying, search results associated with the first person of interest; and
present, via the user interface, an indication of the search results to the officer.

22. The system of claim 21, wherein the one or more fourth databases includes a warrants database, and the search results are indicative of one or more warrants associated with the first person of interest.

23. The system of claim 21, wherein the one or more fourth databases includes a crime database, and the search results are indicative of a criminal history of the first person of interest.

24. The system of claim 21, wherein the one or more fourth databases includes a mental health database, and the search results are indicative of mental health events associated with the first person of interest.

25. The system of claim 1, wherein the controller of the handheld device is a first controller, wherein the handheld device further includes a memory communicably coupled to the first controller, to store the first executed ticket generated via the handheld device, the system further comprising:
a ticket database communicably coupleable to the handheld device over a network to store past executed tickets; and
a server communicably coupled to the ticket database and including a second controller,
wherein the first controller is further configured to, after the transmitting the indication of the executed ticket, upon establishing network connectivity with the ticket database over the network, transfer data associated with the first executed ticket to the ticket database,
wherein the second controller is configured to:
correlate the first executed ticket with one or more tickets of the past executed tickets in the ticket database based on one or more of the personal identification information and the vehicle identification information of the first executed ticket; and
if no correlation of the first executed ticket with any ticket of the past executed tickets exists, flag the first executed ticket for manual review.

26. The system of claim 25, wherein the second controller is further configured to place data associated with the first executed ticket on a streaming data feed over the network for consumption by third party devices.

27. A method for issuing, by an officer, a ticket to an offender associated with a legal violation, the method comprising:
acquiring, upon input from the officer, via an optical scanner included in a handheld device, personal information associated with a driver license of the offender;
acquiring, upon input from the officer, via the optical scanner, vehicle information associated with a vehicle associated with the offender and with the legal violation;
receiving, from the officer, an indication of the legal violation;
without further input from the officer, generating the ticket by:
acquiring, via a location sensor included in the handheld device, location information associated with the handheld device;
querying, via a network interface included in the handheld device, one or more second databases with the personal information, and receiving, in response to the said querying, at least a portion of person identification information of the offender;
querying, via the network interface, one or more third databases with the vehicle information, and receiving, in response to the said querying, at least a portion of the vehicle identification information of the offender;
querying, via the network interface, a first database with the indication of the legal violation and receiving, in response to said querying, a specification of a first remedial option of a set of remedial options associated with that legal violation, wherein the first database is communicably coupled to the handheld device and includes location-specific legal information, the location-specific legal information specifying remedial options available for each legal violation in a predetermined area;
generating, via a controller included in the handheld device, the ticket including the personal identification information, the vehicle identification information, the legal violation, an indication of the first remedial option, and a field to receive a signature of the offender;
receiving, at the controller, the signature of the offender to generate an executed ticket; and
transmitting, from the controller, an indication of the executed ticket to one or more of a printing device, to another handheld device associated with the offender, or an email account associated with the offender.

28. The method of claim 27, wherein the executed ticket is a first executed ticket, the method further comprising:
storing, in a memory communicably coupled to the controller, a set of executed tickets, the set of executed tickets including the first executed ticket generated via the handheld device.

29. The method of claim 28, wherein the portion of the person identification information is a first portion of the person identification information, the method further comprising:

querying the stored set of executed tickets to identify a second portion of the person identification information.

30. The method of claim 28, wherein the portion of the vehicle identification information is a first portion of the vehicle identification information, the method further comprising:

querying the stored set of executed tickets to identify a second portion of the vehicle identification information.

31. The method of claim 30, wherein the vehicle identification information is a unique vehicle identification number (VIN), the method further comprising:

storing, in the memory, a VIN reference table; and identify, via the controller, the second portion of the vehicle identification information based on the VIN reference table.

32. The method of claim 27, wherein the vehicle information is a license plate number associated with the vehicle.

33. The method of claim 27, wherein generating the ticket further comprises generating a unique ticket number, wherein the generated ticket includes the unique ticket number.

34. The method of claim 27, wherein the indication of the first remedial option includes a machine readable code, the method further comprising:

generating the ticket by generating the machine readable code based on the specification of the first remedial option received from the third database.

35. The method of claim 34, wherein generating the ticket include generating a unique ticket number, and wherein the machine readable code includes the unique ticket number.

36. The method of claim 27, wherein the indication of the first remedial option includes an indication of electronic payment.

37. The method of claim 27, wherein the indication of the first remedial option includes an indication of a requirement for court appearance.

* * * * *